US012591813B1

(12) United States Patent
Mahale et al.

(10) Patent No.: US 12,591,813 B1
(45) Date of Patent: Mar. 31, 2026

(54) USING MACHINE LEARNING MODELS TO CAUSE OPERATOR ACTIONS

(71) Applicant: Citibank, N.A., New York, NY (US)

(72) Inventors: Ramnath Mahale, Chadds Ford, PA (US); Promiti Dutta, New York, NY (US); Thomas Joseph Snyder, Hoboken, NJ (US); Murli D. Buluswar, Tenafly, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/274,355

(22) Filed: Jul. 18, 2025

Related U.S. Application Data

(63) Continuation-in-part of application No. 17/541,975, filed on Dec. 3, 2021, now abandoned.

(51) Int. Cl.
G06N 20/00 (2019.01)

(52) U.S. Cl.
CPC .................................... G06N 20/00 (2019.01)

(58) Field of Classification Search
CPC .................................................. G06N 20/00
See application file for complete search history.

(56) References Cited

U.S. PATENT DOCUMENTS

| | | | |
|---|---|---|---|
| 6,584,464 B1 | 6/2003 | Warthen | |
| 7,974,869 B1 | 7/2011 | Sharma et al. | |
| 10,990,988 B1 | 4/2021 | Goyette et al. | |
| 11,900,451 B1 * | 2/2024 | King ...................... | G06Q 40/03 |

| | | |
|---|---|---|
| 2004/0103017 A1 | 5/2004 | Reed et al. |
| 2013/0055137 A1 | 2/2013 | Choc et al. |
| 2014/0046757 A1 | 2/2014 | Kahn et al. |
| 2015/0052503 A1 | 2/2015 | Ligman et al. |
| 2015/0161652 A1 | 6/2015 | Schnabl et al. |
| 2016/0005072 A1 | 1/2016 | Robinson |
| 2016/0210656 A1 | 7/2016 | Chittilappilly et al. |
| 2018/0101771 A1 | 4/2018 | Schwarm et al. |
| 2018/0240145 A1 | 8/2018 | Zargham et al. |
| 2019/0164176 A1 | 5/2019 | Pydynowski et al. |
| 2019/0266621 A1 | 8/2019 | Eckman et al. |

(Continued)

FOREIGN PATENT DOCUMENTS

WO          2021038759 A1      3/2021

OTHER PUBLICATIONS

Bohanec et al., "Explaining Machine Learning Models in Sales Predictions", Expert Systems with Applications 71 (2017) 416-428. (Year: 2017).

*Primary Examiner* — Brent Johnston Hoover
(74) *Attorney, Agent, or Firm* — Perkins Coie LLP

(57) ABSTRACT

Methods and systems are described for utilizing machine learning models to generate a response. The system receives an operator input requesting actions to prompt a desired user interaction. The system selects user-specific machine learning models trained on interactions associated with each user of a plurality of users. Based on the operator input, the system determines a model subset and selects a candidate operator action to test. The system inputs the candidate action into each model of the subset to obtain a predicted user interaction. The system then assesses whether the candidate action causes the models to predict the desired interaction. If the candidate action is effective, the system executes the candidate action in relation to the user subset.

20 Claims, 18 Drawing Sheets

1700

End-to-end solution architecture

(56) References Cited

U.S. PATENT DOCUMENTS

| 2019/0378074 | A1 | 12/2019 | Mcphatter et al. |
| 2020/0273052 | A1 | 8/2020 | Ganti et al. |
| 2022/0070050 | A1 | 3/2022 | D'ippolito et al. |
| 2024/0039882 | A1* | 2/2024 | Varma ..................... H04L 51/48 |

\* cited by examiner

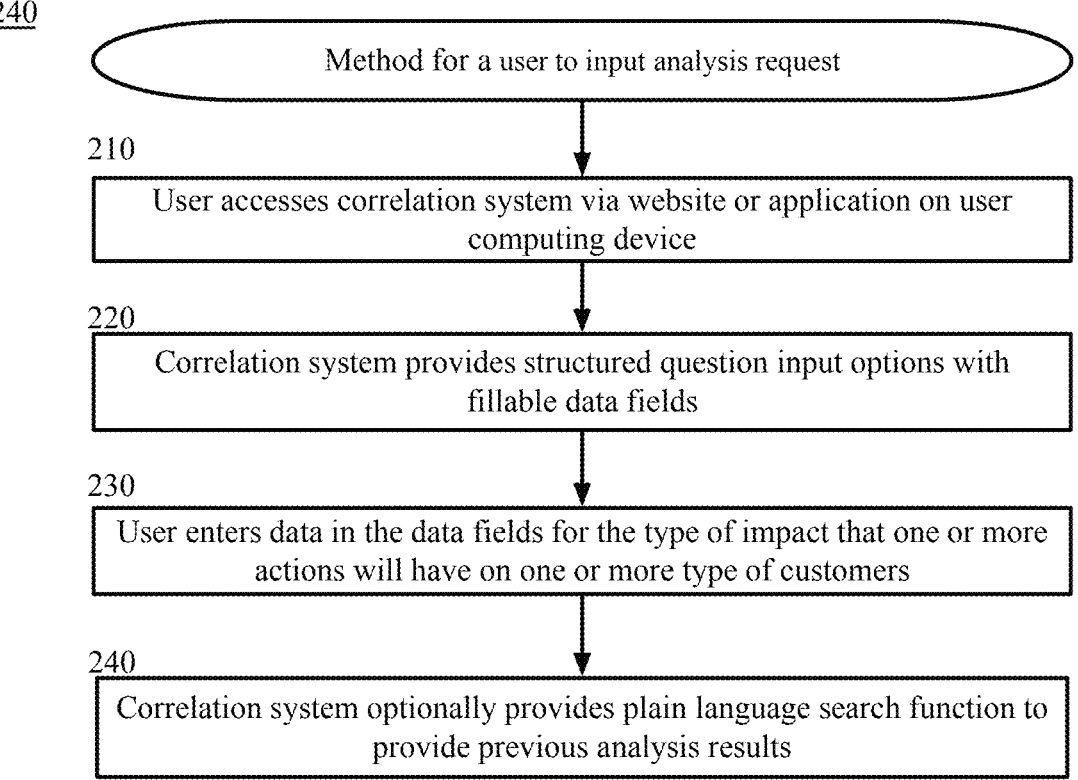

240

Method for a user to input analysis request

210

User accesses correlation system via website or application on user computing device

220

Correlation system provides structured question input options with fillable data fields

230

User enters data in the data fields for the type of impact that one or more actions will have on one or more type of customers

240

Correlation system optionally provides plain language search function to provide previous analysis results

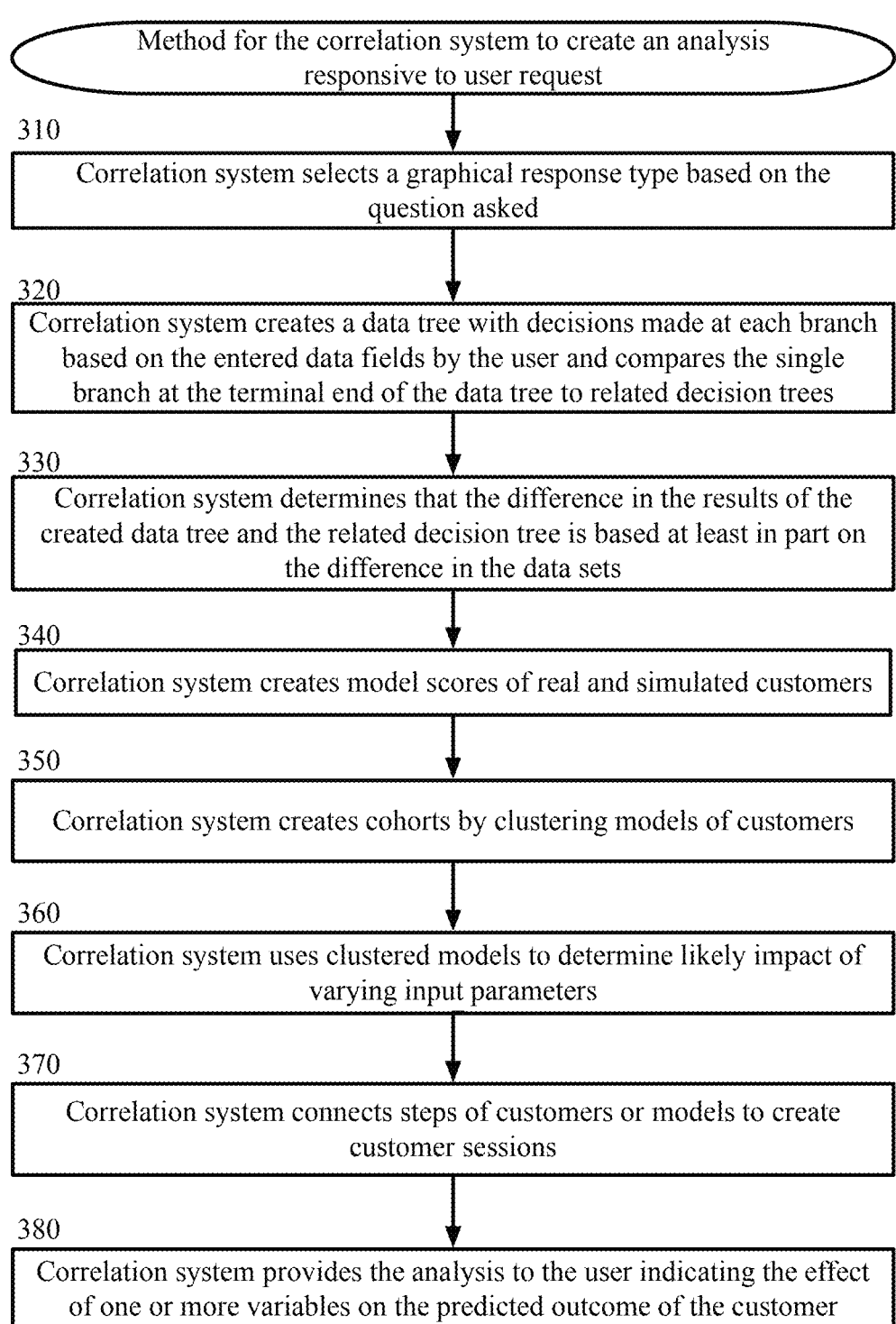

Method for the correlation system to create an analysis responsive to user request 310
Correlation system selects a graphical response type based on the question asked 320
Correlation system creates a data tree with decisions made at each branch based on the entered data fields by the user and compares the single branch at the terminal end of the data tree to related decision trees 330
Correlation system determines that the difference in the results of the created data tree and the related decision tree is based at least in part on the difference in the data sets 340
Correlation system creates model scores of real and simulated customers 350
Correlation system creates cohorts by clustering models of customers 360
Correlation system uses clustered models to determine likely impact of varying input parameters 370
Correlation system connects steps of customers or models to create customer sessions 380
Correlation system provides the analysis to the user indicating the effect of one or more variables on the predicted outcome of the customer

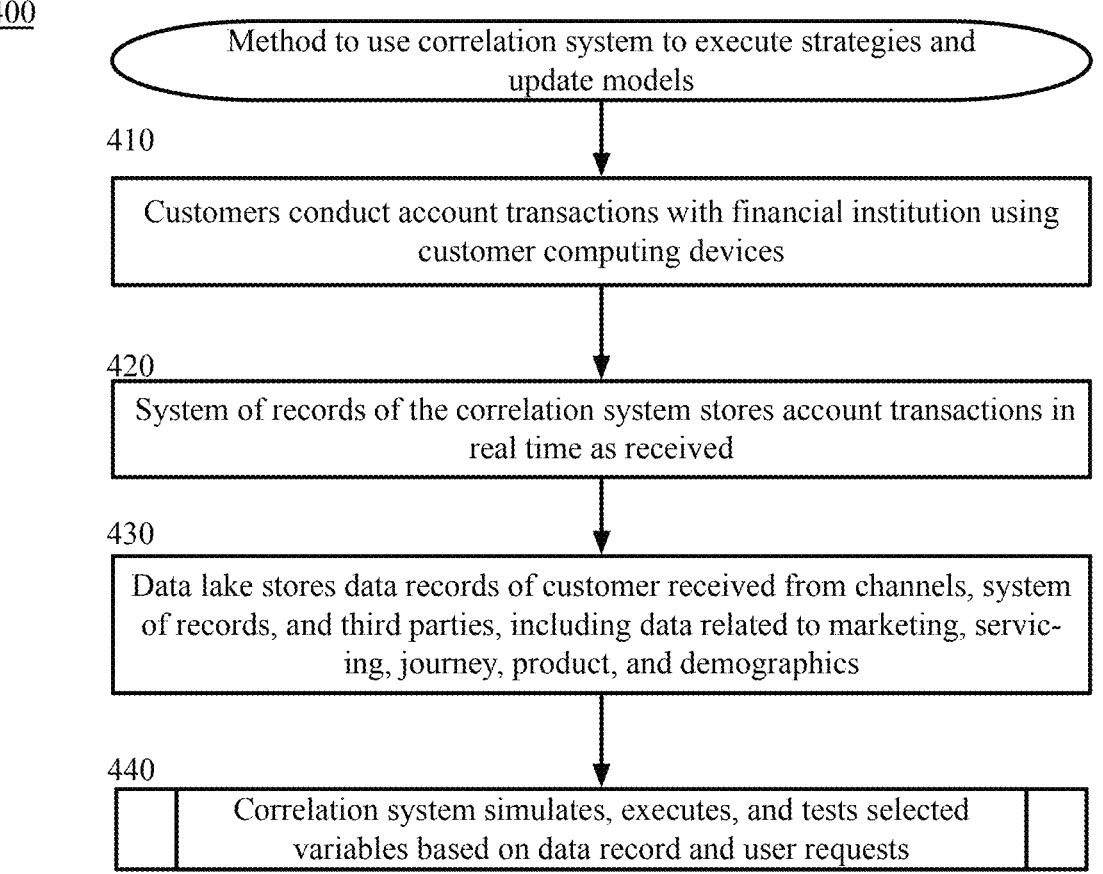

410

Customers conduct account transactions with financial institution using customer computing devices

420

System of records of the correlation system stores account transactions in real time as received

430

Data lake stores data records of customer received from channels, system of records, and third parties, including data related to marketing, servicing, journey, product, and demographics

440

Correlation system simulates, executes, and tests selected variables based on data record and user requests

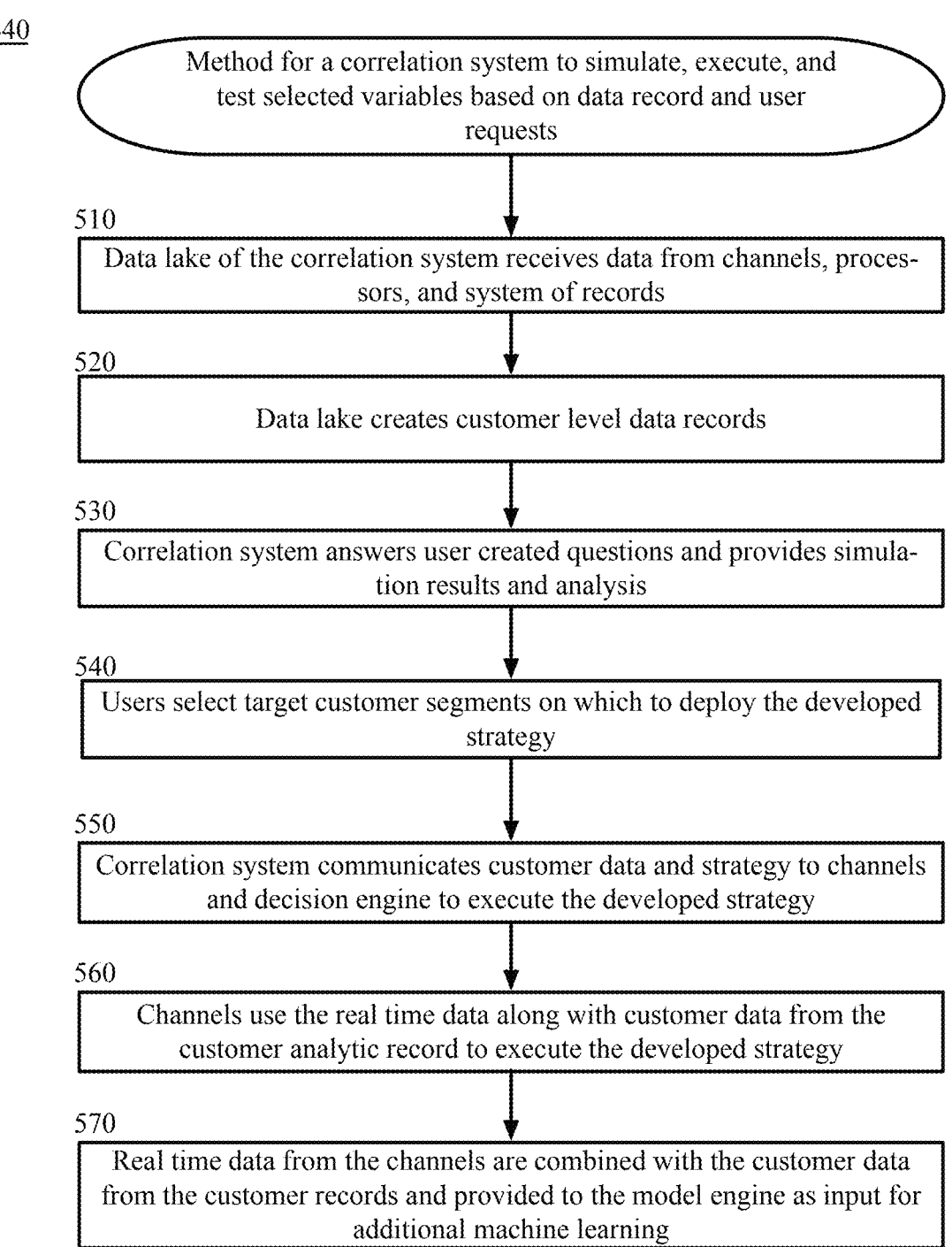

Method for a correlation system to simulate, execute, and test selected variables based on data record and user requests

510

Data lake of the correlation system receives data from channels, processors, and system of records

520

Data lake creates customer level data records

530

Correlation system answers user created questions and provides simulation results and analysis

540

Users select target customer segments on which to deploy the developed strategy

550

Correlation system communicates customer data and strategy to channels and decision engine to execute the developed strategy

560

Channels use the real time data along with customer data from the customer analytic record to execute the developed strategy

570

Real time data from the channels are combined with the customer data from the customer records and provided to the model engine as input for additional machine learning

Recent Jobs

Q search          Clear Filter                                    1305                                    1312                        Items per page: 10

| Job Name | Impact | KPI | Segment | Bench-marks | Period | Potential Drivers | Created Date (MM/DD/YYYY) | Confi-dence | Job ID | |
|---|---|---|---|---|---|---|---|---|---|---|
| GGTTT | Drivers | Bank Digital Engagement Index | Resistor Retail | | Feb 2020-Apr 2021 | Count of account affinity rebate | 10/29/2021 | | JID20211010162619 | Executed  Load |
| Explore Segment – Ca... | Explore Segments | | | | Mar 2021-Mar 2021 | | 10/29/2021 | | JID20211010152737 | Executed  Load |
| Explore Segment – Ba... | Explore Segments | | | | Mar 2021-Mar 2021 | | 10/29/2021 | | JID20211010151614 | Executed  Load |
| What are the Drivers ... | Drivers | Bank Digital Engagement Index | | | Jan 2020-Jan 2021 | All | 10/29/2021 | | JID20211010015725 | Executed  Load |
| What are the Drivers ... | Drivers | Bank Digital Engagement Index | | | Jan 2020-Mar 2021 | All | 10/29/2021 | | JID20211010144456 | Executed  Load |
| What is the Trend of B... | Trend | Bank Digital Engagement Index | | | May 2020-Dec 2020 | All | 10/29/2021 | | JID20211010181554 | Executed  Load |
| 1301 |  |  |  |  |  |  |  |  |  |  |
| What is the Trend of B... | Trend | Bank Digital Engagement Index | | | Jan 2020-Jan 2021 | All | 10/29/2021 | | JID20211010115915 | Failed |
| What is the Trend of T... | Trend | Travel spend amount | | | Jan 2020-Mar 2021 | All | 10/29/2021 | | JID20211010118265 | Executed  Load |
| GGTTT | Trend | Bank Digital Engagement Index | High Fee and Complaints Users | | Jan 2020-Jan 2021 | All | 10/29/2021 | | JID20211010043344 | Failed |
| What are the Detracto... | Detractors | Bank potential value | | | Jan 2020-Jan 2021 | All | 10/28/2021 | | JID20211010204428 | Executed  Load |

1302      1303        1304                  1306      1311                    1307                 1308      1309  1310

Items per page: 10

MENU          Correlation Hub

Dark Mode

Correlation Hub

Search 🔍    LOB ▾    Feature ▾    Source ▾    Search    Reset
　1601　　1602　　　　　1603　　　　　1604

| Feature | Field | Definition | Implication | LOB | History | Load Freq | Source |
|---------|-------|------------|-------------|-----|---------|-----------|--------|
| Customer Def | Restaurant_Spend | Total dollars card spends on restaurant related transaction | Data is limited to cars and not for debit cards, published by membercard | Cards | Jan 2020 | Monthly | Cards Transactions P_BCD_V_I_CONSUMER |
| Metric | Digital Engagement Index | Ratio of digital events to all events a customer has | 0.8 is considered high digital user | Cards DNBA | Dec 2020 | Quarterly | Proprietary Model |

End-to-end solution architecture

USING MACHINE LEARNING MODELS TO CAUSE OPERATOR ACTIONS

CROSS-REFERENCE TO RELATED APPLICATIONS

This application is a continuation-in-part of U.S. patent application Ser. No. 17/541,975 filed Dec. 3, 2021. The content of the foregoing application is incorporated herein in its entirety by reference.

SUMMARY

Managing resource usage and maintaining system performance in a virtualized environment involves technical challenges. These challenges may be exacerbated when users do not spin up new virtual machines as needed. For example, when users' virtual machines reach high usage levels, for example, around 80% or more, the system may experience significant slowdowns, leading to degraded performance and potential access issues. This situation necessitates a proactive approach to encourage users to spin up additional virtual machines to distribute loads more evenly. However, predicting when and how to effectively communicate this need to users involves understanding complex user behavior patterns, resource usage trends, and the effectiveness of various communication methods. The system must be capable of real-time monitoring and analysis to identify when resource usage thresholds are being approached and to trigger timely and persuasive communications. These technical challenges require sophisticated algorithms and machine learning models to ensure that the system may adapt to changing conditions and effectively prompt users to take the necessary actions to maintain optimal performance.

Furthermore, conventional methods of prompting users to take action may be limited due to their reliance on static, sequential, or uniform communication strategies. Static communication strategies often fail to account for the dynamic and individualized nature of these factors, resulting in suboptimal responses from users. Sequential approaches involve sending messages to users in a predetermined order, which may introduce delays and reduce the overall effectiveness of the communication. As each message must be sent and potentially acted upon before the next one is considered, the overall time required to prompt users to spin up new virtual machines may be significant. This sequential approach may also increase the risk of communication bottlenecks and inefficiencies, as any delay or issue in the communication process may impact the entire user engagement strategy. Additionally, users may be more resistant to taking action if they perceive the communication as repetitive or irrelevant, further complicating and delaying the process.

The disclosed solution addresses these challenges, for example, by utilizing machine learning to identify a preferred communication strategy for prompting users to spin up new virtual machines. The preferred strategy may include sending messages when, for example, a user's virtual machine usage reaches a certain threshold, such as 80% usage, which may lead to potential issues with access and response times. Machine learning models may be trained to take into account predefined criteria for the communication, such as resource usage, user behavior, and the effectiveness of different communication methods. By dynamically analyzing and weighing these factors, the models may determine communication strategies for certain users. This adaptive approach may ensure that the communication process is responsive to real-time changes in user behavior and resource usage, thereby optimizing user engagement and increasing the likelihood of users spinning up new virtual machines.

The system may simulate different communication strategies using a subset of machine learning models to determine the most effective approach for each user. For example, the system may input a scenario where one email is sent, and each model may indicate whether this results in the desired action of spinning up a new virtual machine. If the model indicates that this approach is not effective, the system may try a different strategy, such as sending a text message and three emails, to see if this results in the desired action. This method may enhance the reliability and effectiveness of the communication process, as it allows for continuous optimization based on real-time data and user behavior.

The system may then initiate a selected communication process. The system may transmit a first message to inform the user of the potential issues with their current virtual machine usage and a second message to prompt them to spin up a new virtual machine. After transmitting the initial messages, the system may continue to monitor the user's response and adjust the communication strategy as needed. This approach may ensure that the user receives timely and relevant information, increasing the likelihood of them taking the desired action. By prioritizing these communications, the system establishes a clear and effective framework for user engagement, allowing subsequent actions to be dealt with separately.

In particular, the system may receive an operator input for one or more actions that cause a user interaction to be performed. For example, an operator input may request actions (e.g., communications) to take that are likely to cause a desired result. A desired result may be that the user spins up a new virtual machine or takes a different action. As an illustrative example, a single email may be ineffective for prompting the user to spin up a new virtual machine. However, three emails and a call may alienate the user and cause an undesired result (e.g., the user spins down a virtual machine). The system may therefore request a communication strategy that will be effective for the user.

The system may select, based on the operator input, a plurality of user-specific machine learning models. Each of the plurality of user-specific machine learning models is trained based on user interactions received as real time data from a corresponding user of a plurality of users and corresponding actions associated with the user interactions. For example, one model of the plurality of user-specific machine learning models may be trained on data showing that User A typically responds positively to email communications sent in the morning, while another model may indicate that User B is more likely to take action after receiving a text message in the afternoon. These models may incorporate various features such as the timing of communications, the content of messages, and the user's historical response patterns. Additionally, the system may continuously update these models with new interaction data, ensuring that the communication strategies remain effective and relevant over time.

The system may determine, based on the operator input, a model subset of the plurality of user-specific machine learning models. For example, the model subset may correspond to a user subset of the plurality of users, and the model subset may be selected based on the operator input. This selection process may involve filtering the user-specific models to identify those that are most relevant to the operator's specified criteria. For instance, if the operator input specifies targeting users who are likely to need additional virtual machines due to high resource usage, the system may identify models that predict user behavior based on current and historical resource utilization data. An illustrative example may involve an operator input that specifies targeting users whose virtual machines are operating at 80% capacity or higher. The system may then filter the user-specific models to find those that correspond to users meeting this criterion. These models may include data on each user's past interactions, response to previous communications, and patterns of virtual machine usage. By focusing on this subset of models, the system may ensure that the selected communication strategies are tailored to users who are most likely to benefit from spinning up a new virtual machine.

The system may select a candidate operator action for the user subset. This selection process may involve identifying the most effective potential actions to prompt the desired behavior from the targeted users. For example, the system may target a user subset identified as having virtual machines operating at 80% capacity or higher. The system may select a candidate operator action that includes sending an initial email alerting the users to the high usage of their current virtual machines and a reminder text message a day later, providing a direct link to the virtual machine setup page. In some embodiments, the initial email may include detailed information about the potential performance issues that could arise from high resource usage and the advantages of adding a new virtual machine. The follow-up text message may be concise and include a call to action, such as "Set up your new virtual machine now to avoid performance issues."

The system may input, into each user-specific machine learning model of the model subset of the plurality of user-specific machine learning models, the candidate operator action to obtain a corresponding user interaction. This step may involve simulating the selected action within each model to predict how the users in the subset are likely to respond. By doing so, the system may gain insights into the effectiveness of the proposed action before it is actually implemented. For example, if the candidate operator action involves sending an email followed by a text message to users with high virtual machine usage, the system may input this sequence of actions into each relevant user-specific model. The models may then analyze various factors such as the user's past behavior, preferences, and response patterns to predict the likelihood of the user spinning up a new virtual machine as a result of the communication. Aa an illustrative example, a user-specific model may have previously shown a high response rate to email communications. When the candidate operator action of sending an email and a follow-up text message is input into this model, the model may predict a high probability of the user taking the desired action. Conversely, if another model corresponds to a user who is less responsive to emails but more likely to react to phone calls, the model may predict a low probability of the user taking the desired action.

The system may determine whether the candidate operator action causes the model subset of the plurality of user-specific machine learning models to output the desired user interaction. This may involve evaluating the predictions generated by the user-specific models to assess the effectiveness of the proposed action. By analyzing these outputs, the system may identify whether the candidate action is likely to achieve the intended result, such as prompting users to spin up new virtual machines. For example, after inputting the candidate operator action (e.g., sending an email followed by a text message) into the subset of user-specific models, the system may review the predicted user interactions. If the majority of the models indicate a high probability that users will respond by spinning up new virtual machines, the system may determine that the candidate action is effective. Conversely, if the models predict low engagement or a different outcome, the system may conclude that the action needs to be adjusted. In some embodiments, the user-specific models predict varying levels of responsiveness to the candidate action. Some models may indicate that users are likely to spin up new virtual machines after receiving the email and text message, while others may suggest that additional follow-up actions are necessary. The system may then analyze these predictions to identify patterns and determine the overall effectiveness of the candidate action.

Based on determining that the candidate operator action causes the model subset of the plurality of user-specific machine learning models to output the user interaction, the system may generate instructions for executing the candidate operator action in relation to the user subset. The system may generate the instructions based on the candidate operator action. For example, if the system has determined that sending an email followed by a text message is likely to prompt users to spin up new virtual machines, it may generate specific instructions for executing this action. These instructions may include the content of the email and text message, the timing for sending each communication, and any additional follow-up actions that may be necessary. In some embodiments, the system may generate an email template that includes information about the user's current virtual machine usage, the potential performance issues that could arise from high resource utilization, and the benefits of spinning up a new virtual machine. The instructions may specify that this email should be sent at a particular time, such as during business hours when users are most likely to check their emails. Additionally, the system may generate a text message template that serves as a reminder and includes a direct link to the virtual machine setup page. The instructions may indicate that this text message should be sent one day after the email to reinforce the message and prompt immediate action. The system may also include instructions for monitoring user responses and adjusting the strategy as needed.

The system may execute the candidate operator action in relation to each user of the plurality of users. This may involve implementing the detailed instructions generated in the previous step to carry out the proposed communication strategy effectively. By executing the candidate operator action, the system may prompt the desired user interaction, such as spinning up new virtual machines. For example, if the candidate operator action involves sending an email followed by a text message, the system may begin by dispatching the email to each user identified in the subset. The email may contain information about the user's current virtual machine usage, potential performance issues, and the benefits of adding a new virtual machine. The system may ensure that the email is sent at an optimal time to maximize the likelihood of it being read and acted upon. Following the email, the system may send a text message to each user as a reminder. This text message may be concise and include a direct link to the virtual machine setup page, making it easy for users to take immediate action. The timing of the text message may be carefully planned to follow the email by a day, reinforcing the message and prompting users to respond.

As an illustrative example, the system may send the email and text message as planned to a user. The user may read the email, understands the potential performance issues, and decides to spin up a new virtual machine. The text message serves as a timely reminder, providing a convenient link to complete the setup process. As a result, the user successfully spins up a new virtual machine, addressing the high resource usage and improving overall system performance. The system may also monitor user responses and adjust the strategy as needed. For example, if a user does not respond to the initial email and text message, the system may execute additional follow-up actions, such as sending another email or making a phone call to provide further support and encouragement. By executing the candidate operator action in relation to each user, the system may effectively prompt the desired user interaction, leading to improved resource management and enhanced user satisfaction. This targeted approach ensures that the communication strategy is implemented efficiently, maximizing the likelihood of achieving the desired outcome.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 is a block flow diagram depicting a method for a user to input analysis requests.

FIG. 3 is a block flow diagram depicting a method to create an analysis responsive to a user request.

FIG. 4 is a block flow diagram depicting a method to use a correlation system to execute strategies and update models.

FIG. 5 is a block flow diagram depicting a method to simulate, execute, and test selected variables based on data records and user requests.

FIG. 13 is an illustration of a user interface displaying completed queries.

FIG. 16 is an illustration of an explanation screen for analytics delivered in the user interface.

DETAILED DESCRIPTION

Figure 1:
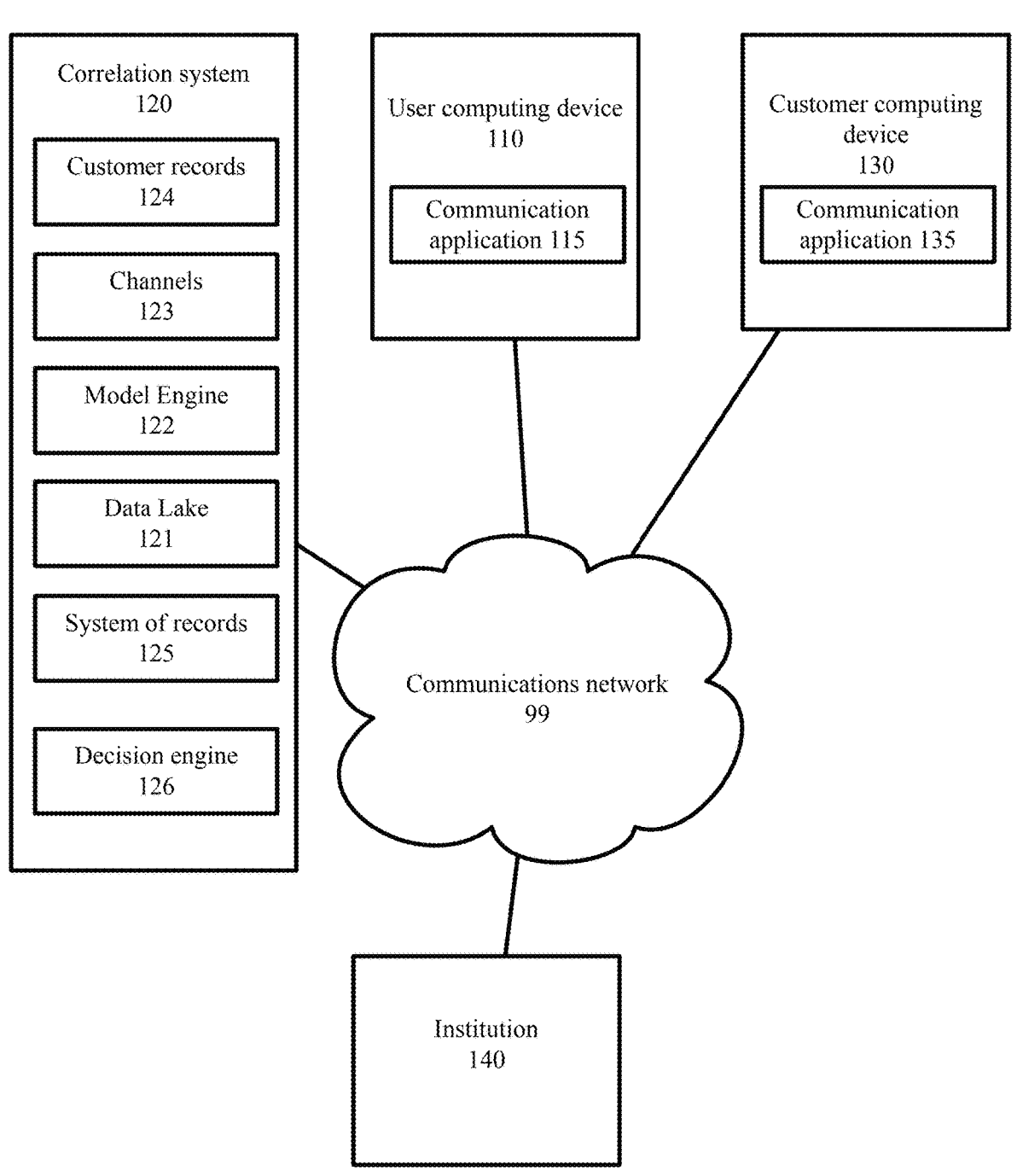
FIG. 1 is a block diagram depicting a system to use a correlation system to simulate, test, and analyze selected variables on customer models.

The disclosed solution addresses challenges relating to determining operator actions that are likely to cause a user interaction to be performed. As an example, this solution may overcome technical challenges such as resource usage and system performance in a virtualized environment by utilizing machine learning to identify a preferred communication strategy. The preferred communication strategy may be likely to cause performance of a user interaction, such as causing users to spin up new virtual machines. Spinning up or down a new virtual machine includes the process of creating or terminating virtual instances within a cloud or virtualized environment. Spinning up a virtual machine involves allocating the necessary computing resources, such as CPU, memory, and storage, to create a new virtual instance that may run applications, host services, or perform specific tasks. This process may include configuring the virtual machine with the appropriate operating system, software, and network settings to ensure it is ready for use. Conversely, spinning down a virtual machine involves deallocating these resources and terminating the virtual instance when it is no longer needed. This action may help optimize resource utilization, reduce costs, and maintain system performance by freeing up resources for other tasks or virtual machines.

The system may receive an operator input for one or more actions that cause a user interaction to be performed. For example, an operator input may request actions (e.g., communications) to take that are likely to cause a desired result. A desired result may be that the user spins up a new virtual machine. The operator may input a request for a communication strategy, such as sending a notification to the user when their current virtual machine reaches a certain usage threshold, indicating that they may soon experience performance issues. Additionally, the operator may request actions such as scheduling a follow-up reminder if the user does not respond within a specified timeframe or providing a direct link to the virtual machine setup page to facilitate quick action.

The system may select, based on the operator input, a plurality of user-specific machine learning models. Each of the plurality of user-specific machine learning models is trained based on user interactions received as real time data from a corresponding user of a plurality of users and corresponding actions associated with the user interactions. These models are trained using historical data that includes various user behaviors, preferences, and responses to different types of communications and actions. For example, the training data may consist of records showing how users responded to notifications about high virtual machine usage, including whether they spun up new virtual machines, ignored the messages, or took other actions. The models may also incorporate contextual information such as the time of day the messages were sent, the content and format of the communications, and any follow-up actions taken. By analyzing this data, the machine learning models may identify patterns and predict the most effective strategies for prompting desired user interactions. This training process enables the models to adapt to individual user behaviors and preferences, allowing the system to tailor its communication strategies to maximize the likelihood of achieving the desired outcomes.

As an example, one model of the plurality of user-specific machine learning models may be trained on data showing that User A typically responds positively to email communications sent in the morning, while another model may indicate that User B is more likely to take action after receiving a text message in the afternoon. These models may incorporate various features such as the timing of communications, the content of messages, and the user's historical response patterns. Additionally, the system may continuously update these models with new interaction data, ensuring that the communication strategies remain effective and relevant over time.

In some embodiments, the system selects the plurality of user-specific machine learning models by identifying user-specific machine learning models where a target feature corresponds to the user interaction within the operator input. This process may involve filtering through the available models to find those that are specifically trained to predict the desired user interaction, such as spinning up a new virtual machine. The target feature in these models represents the specific action or behavior that the system aims to prompt in the user. For example, if the operator input requests a communication strategy to encourage users to spin up new virtual machines, the system may identify models where the target feature is the user's likelihood to spin up new virtual machines. By focusing on these relevant models, the system may ensure that the selected machine learning models are highly specialized and accurate in predicting the desired outcome.

The system may determine, based on the operator input, a model subset of the plurality of user-specific machine learning models. For example, the model subset may correspond to a user subset of the plurality of users, and the model subset may be selected based on the operator input. This selection process may involve filtering the user-specific models to identify those that are most relevant to the operator's specified criteria. For instance, if the operator input specifies targeting users who are likely to need additional virtual machines due to high resource usage, the system may identify models that predict user behavior based on current and historical resource utilization data. An illustrative example may involve an operator input that specifies targeting users whose virtual machines are operating at 80% capacity or higher. The system may then filter the user-specific models to find those that correspond to users meeting this criterion. These models may include data on each user's past interactions, response to previous communications, and patterns of virtual machine usage. By focusing on this subset of models, the system may ensure that the selected communication strategies are tailored to users who are most likely to benefit from spinning up a new virtual machine.

In some embodiments, determining the model subset based on the operator input involves identifying, within the operator input, one or more parameters representing one or more user characteristics of the plurality of users. The system may then match the one or more parameters with user parameters associated with the plurality of users. The system may then select the user subset based on the user parameters that match the one or more parameters. For example, the operator input may specify characteristics such as users with virtual machines operating at 80% capacity or higher, users who have previously responded to email notifications, or users within a specific geographic region. The system may then analyze the user data to find those who meet these criteria. Once the matching user parameters are identified, the system may select the model subset based on the user parameters that match the one or more parameters. This targeted selection process ensures that the communication strategies and actions are tailored to the specific needs and behaviors of the relevant users, thereby increasing the likelihood of achieving the desired outcome, such as prompting users to spin up new virtual machines.

The system may select a candidate operator action for the user subset. This selection process may involve identifying the most effective potential actions to prompt the desired behavior from the targeted users. For example, the system may target a user subset identified as having virtual machines operating at 80% capacity or higher. The system may select a candidate operator action that includes sending an initial email alerting the users to the high usage of their current virtual machines and a reminder text message a day later, providing a direct link to the virtual machine setup page. In some embodiments, the initial email may include detailed information about the potential performance issues that could arise from high resource usage and the advantages of adding a new virtual machine. The follow-up text message may be concise and include a call to action, such as "Set up your new virtual machine now to avoid performance issues."

In some embodiments, selecting the candidate operator action for the user subset involves retrieving, from a training dataset used to train one or more machine learning models of the plurality of user-specific machine learning models, a plurality of operator actions leading to a plurality of user actions. The training dataset may contain historical data on various operator actions and the corresponding user responses, such as sending notifications, emails, or text messages, and the subsequent user actions like spinning up new virtual machines or ignoring the communications. By analyzing this dataset, the system may identify patterns and determine which operator actions have been most effective in prompting the desired user interactions. The system may then select the candidate operator action from the plurality of operator actions that have shown a high likelihood of success. For example, if the data indicates that users with high virtual machine usage are more likely to respond to a combination of an email followed by a text message, the system may choose this as the candidate operator action.

The system may then input, into each user-specific machine learning model of the model subset of the plurality of user-specific machine learning models, the candidate operator action to obtain a corresponding user interaction. This step may involve simulating the selected action within each model to predict how the users in the subset are likely to respond. By doing so, the system may gain insights into the effectiveness of the proposed action before it is actually implemented. For example, if the candidate operator action involves sending an email followed by a text message to users with high virtual machine usage, the system may input this sequence of actions into each relevant user-specific model. The models may then analyze various factors such as the user's past behavior, preferences, and response patterns to predict the likelihood of the user spinning up a new virtual machine as a result of the communication. Aa an illustrative example, a user-specific model may have previously shown a high response rate to email communications. When the candidate operator action of sending an email and a follow-up text message is input into this model, the model may predict a high probability of the user taking the desired action. Conversely, if another model corresponds to a user who is less responsive to emails but more likely to react to phone calls, the model may predict a low probability of the user taking the desired action.

In some embodiments, the system may receive, from each user-specific machine learning model of the model subset, the corresponding user interaction determined by each user-specific machine learning model. For example, the system may receive a top prediction from each machine learning model of the model subset. The top prediction may include one or more actions that are likely to cause the user to perform the user interaction. In some embodiments, the system further receives confidence scores associated with each output. These confidence scores indicate the likelihood that the predicted actions will result in the desired user interaction, such as spinning up a new virtual machine. By analyzing these confidence scores, the system may assess the reliability of each prediction and prioritize actions with higher confidence levels. As an example, if one model predicts with 80% confidence that sending an email followed by a text message will prompt the user to spin up a new virtual machine, while another model predicts with only 50% confidence that the same actions will be effective, the system may prioritize the higher-confidence prediction.

The system may determine whether the candidate operator action causes the model subset of the plurality of user-specific machine learning models to output the desired user interaction. This may involve evaluating the predictions generated by the user-specific models to assess the effectiveness of the proposed action. In particular, after inputting the candidate operator action (e.g., sending an email followed by a text message) into the subset of user-specific models, the system may review the predicted user interactions. If the majority of the models indicate a high probability that users will respond by spinning up new virtual machines, the system may determine that the candidate action is effective. Models may output different predictions, such as 30%, 60%, etc., indicating varying levels of certainty about the user interaction. To ensure the reliability of the candidate operator action, the system may require that a certain percentage of the models be sufficiently certain about the predicted outcome. For instance, the system may set a threshold requiring at least 70% of the models need to predict a high probability (e.g., at least 80%) of users spinning up new virtual machines for the action to be considered effective. By establishing this criterion, the system may filter out less reliable predictions and focus on actions that have a higher likelihood of success. Analyzing these outputs may enable the system to identify whether the candidate action is likely to achieve the intended result, such as prompting users to spin up new virtual machines.

In some embodiments, if the models predict low engagement or a different outcome, the system may conclude that the action needs to be adjusted. In some embodiments, the user-specific models predict varying levels of responsiveness to the candidate action. Some models may indicate that users are likely to spin up new virtual machines after receiving the email and text message, while others may suggest that additional follow-up actions are necessary. The system may then analyze these predictions to identify patterns and determine the overall effectiveness of the candidate action. This analysis may reveal that certain users respond better to a series of communications, such as an initial email followed by a text message and a reminder email, while others may require more personalized follow-up actions, such as a phone call or a targeted in-app notification.

In some embodiments, determining whether the candidate operator action causes the model subset of the plurality of user-specific machine learning models to output the user interaction involves assessing the outputs from the models. For example, the system may determine, from each corresponding user interaction obtained from each user-specific machine learning model, a number of user interactions that matches the user interaction received with the operator input. The system may then determine whether the candidate operator action causes the model subset of the plurality of user-specific machine learning models to output the user interaction based on the number of user interactions that match. This process involves comparing the predicted user interactions with the desired user interaction specified in the operator input. If a significant number of models predict that the candidate operator action will result in the desired user interaction, such as spinning up a new virtual machine, the system may conclude that the candidate action is effective. Conversely, if only a few models predict the desired outcome, the system may determine that the candidate action is unlikely to be effective. For example, the system may require that a certain percentage of models (e.g., 90%) predict that the candidate operator action will result in the desired user interaction. In some embodiments, another threshold or requirement may be used to assess the number of models outputting user interactions that match the user interaction received with the operator input.

Based on determining that the candidate operator action causes or is likely to cause the model subset of the plurality of user-specific machine learning models to output the user interaction, the system may generate instructions for executing the candidate operator action in relation to the user subset. The system may generate the instructions based on the candidate operator action. For example, if the system has determined that sending an email followed by a text message is likely to prompt users to spin up new virtual machines, it may generate specific instructions for executing this action. These instructions may include the content of the email and text message, the timing for sending each communication, and any additional follow-up actions that may be necessary. In some embodiments, the system may generate an email template that includes information about the user's current virtual machine usage, the potential performance issues that could arise from high resource utilization, and the benefits of spinning up a new virtual machine. The instructions may specify that this email should be sent at a particular time, such as during business hours when users are most likely to check their emails. Additionally, the system may generate a text message template that serves as a reminder and includes a direct link to the virtual machine setup page. The instructions may indicate that this text message should be sent one day after the email to reinforce the message and prompt immediate action. The system may also include instructions for monitoring user responses and adjusting the strategy as needed.

The system may execute the candidate operator action in relation to each user of the plurality of users. This may involve implementing the detailed instructions generated in the previous step to carry out the proposed communication strategy effectively. By executing the candidate operator action, the system may prompt the desired user interaction, such as spinning up new virtual machines. For example, if the candidate operator action involves sending an email followed by a text message, the system may begin by dispatching the email to each user identified in the subset. The email may contain information about the user's current virtual machine usage, potential performance issues, and the benefits of adding a new virtual machine. The system may ensure that the email is sent at an optimal time to maximize the likelihood of it being read and acted upon. Following the email, the system may send a text message to each user as a reminder. This text message may be concise and include a direct link to the virtual machine setup page, making it easy for users to take immediate action. The timing of the text message may be carefully planned to follow the email by a day, reinforcing the message and prompting users to respond.

As an illustrative example, the system may send the email and text message as planned to a user. The user may read the email, understands the potential performance issues, and decides to spin up a new virtual machine. The text message serves as a timely reminder, providing a convenient link to complete the setup process. As a result, the user successfully spins up a new virtual machine, addressing the high resource usage and improving overall system performance. The system may also monitor user responses and adjust the strategy as needed. For example, if a user does not respond to the initial email and text message, the system may execute additional follow-up actions, such as sending another email or making a phone call to provide further support and encouragement. By executing the candidate operator action in relation to each user, the system may effectively prompt the desired user interaction, leading to improved resource management and enhanced user satisfaction. This targeted approach ensures that the communication strategy is implemented efficiently, maximizing the likelihood of achieving the desired outcome.

Based on determining that the candidate operator action does not cause the model subset of the plurality of user-specific machine learning models to output the user interaction, the system may perform one or more steps again using a second candidate operator action from a plurality of operator actions. For example, selecting the second candidate operator action for the user subset may involve retrieving, from a training dataset used to train one or more machine learning models of the plurality of user-specific machine learning models, a plurality of operator actions leading to a plurality of user actions. The system may then select the second candidate operator action from the plurality of operator actions that have shown a high likelihood of success. For example, the system may select a candidate operator action that has a high likelihood of success but that involves different methods of communication or other characteristics as compared to the original candidate operator action. If the original candidate actions involved a combination of an email followed by a text message, the system may choose a different combination of actions as the second candidate action, such as two phone calls separated by at least a week. In some embodiments, the system uses other methods of selecting the second candidate operator action.

The system may then input, into each user-specific machine learning model of the model subset of the plurality of user-specific machine learning models, the second candidate operator action to obtain the corresponding user interaction. For example, the system may input the new combination of actions, such as the two phone calls, into the models to see if this approach is more effective in prompting the desired user interaction, such as spinning up a new virtual machine. By iterating through different candidate actions and evaluating their effectiveness, the system may refine its strategies and identify the most effective communication methods for achieving the desired outcomes. The system may determine that the second candidate operator action causes the model subset of the plurality of user-specific machine learning models to output the user interaction. For example, at least a certain percentage of models of the model subset may indicate a high probability of the second candidate operator action causing the user interaction. This may indicate that the second candidate action is better suited to achieving the desired outcome compared to the original action.

The system may then generate, based on the second candidate operator action, one or more commands for executing the candidate operator action in relation to the user subset. These commands may include specific instructions for sending communications or performing actions that are tailored to the identified user subset. For example, if the second candidate operator action involves making two phone calls separated by a week, the system may generate commands to schedule and initiate these calls, ensuring that they are executed at the appropriate times. The commands may also include follow-up actions, such as sending reminder emails or notifications if the user does not respond to the initial communication. By generating and executing these commands, the system may implement the refined communication strategy, increasing the likelihood of achieving the desired user interaction, such as prompting users to spin up new virtual machines.

In some embodiments, the approach described herein is applicable to user interactions such as prompting users to sign up for a new account (e.g., a credit card account). The system may filter users by their credit score, for example, specifically targeting those with a score greater than 750. This targeted approach may ensure that the communication efforts are directed towards users who are more likely to qualify for and be interested in new credit card accounts. Once the user subset is identified, the system may use machine learning models that are trained on historical data, including user interactions and responses to previous communications. The system may utilize these models to predict the most effective actions to prompt a user to sign up for a new account. For example, the model may suggest sending a text message followed by three emails over a specific period to increase the chances of the user opening a new account.

By inputting candidate actions into the user-specific models, the system may evaluate the predicted outcomes and determine the likelihood of success. If the models indicate a high probability that the proposed actions will result in new account sign-ups, the system may generate and execute the necessary commands to implement the communication strategy. This may involve scheduling and sending the text messages and emails at optimal times to maximize user engagement. If the initial actions do not yield the desired results, the system may iterate through different combinations of actions, continuously refining the strategy based on model predictions and real-time data.

Other Embodiments

Example System Architecture

FIG. 1 is a block diagram depicting a system to use a correlation system to simulate, test, and analyze selected variables on customer models. As depicted in FIG. 1, the architecture 100 includes a correlation system 120, a user computing device 110, a customer computing devices 130, and an institution 140 connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, it should be understood that the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user that is accessing the correlation system 120 to obtain analyses, the customer computing device 130 is operated by a consumer or customer of products offered by the institution 140, the correlation system 120 is operated by a correlation system operator or other user, and an institution 140 is operated by an institution operator. While each server, system, and device shown in the architecture is represented by one instance of the server, system, or device, multiple instances of each can be used.

As shown in FIG. 1, the user computing device 110 includes a data storage unit (not shown) accessible by a communication application 115. The communication application 115 on the user computing device 110 may be, for example, a web browser application or a stand-alone application, to view, download, upload, or otherwise access documents, user interfaces, or web pages via the networks 99. The communication application 115 can interact with web servers or other computing devices connected to the network 99.

As shown in FIG. 1, the customer computing device 130 includes a data storage unit (not shown) accessible by a communication application 135. The communication application 135 on the customer computing device 130 may be, for example, a web browser application or a stand-alone application, to view, download, upload, or otherwise access documents or web pages via the networks 99. The communication application 135 interacts with web servers or other computing devices connected to the network 99.

As shown in FIG. 1, the correlation system 120 includes a data lake 121, a model engine 122, one or more channels 123, customer records 124, a system of records 125, and a decision engine 126. Each of these functions or devices may be encoded in hardware or software, may be functions of a device of the correlation system 120 such as a server, may be in a cloud based computing environment, may be separate devices connected to other devices of the correlation system 120, or may be functions or algorithms operating on other devices of the correlation system 120.

The data lake 121 receives customer level data and creates customer level data records. The data is received from channels 123, system of records 125 and other sources. The model engine 122 receives data records and uses machine learning algorithms or other artificial intelligence to test and learn how customers react to inputs and variables to determine likely success of strategies and simulated customer journeys. The model engine 122 creates models of customers based on real time received data and/or creates simulated models of real or simulated customers based on received data. The channels 123 interact with customers to implement personalized actions for customers that are recommended from the correlation system 120 or from users. The channels 123 use information from at least the customer records 124 and output of systems such as the model engine 122.

The customer records 124 stores data received from customer interactions, previous analysis related to the customer or cohorts of the customer, effects on the customer of triggers or incentives, and other customer data. The system of records 125 includes any data from the institution or the customers related to actions taken by a customer to conduct transactions or otherwise use services of the institution 140. The decision engine 126 either determines actions to execute for a customer or a product based on identified strategy tags for the customer.

The institution 140 is a financial institution or other type of institution that conducts transactions with customers. In certain examples, the transactions are not financial transactions, but are instead transactions such as access transactions, data transfer transactions, authorization transactions, or verification transactions. The correlation system 120 may be a function or division of the institution 140. In another example, the correlation system 120 operates on a processor, server, or other device of the institution 140. The institution 140 may be a bank, a credit card processor, a government entity, a hospital, a university, or any other suitable type of institution 140.

Figure 18:
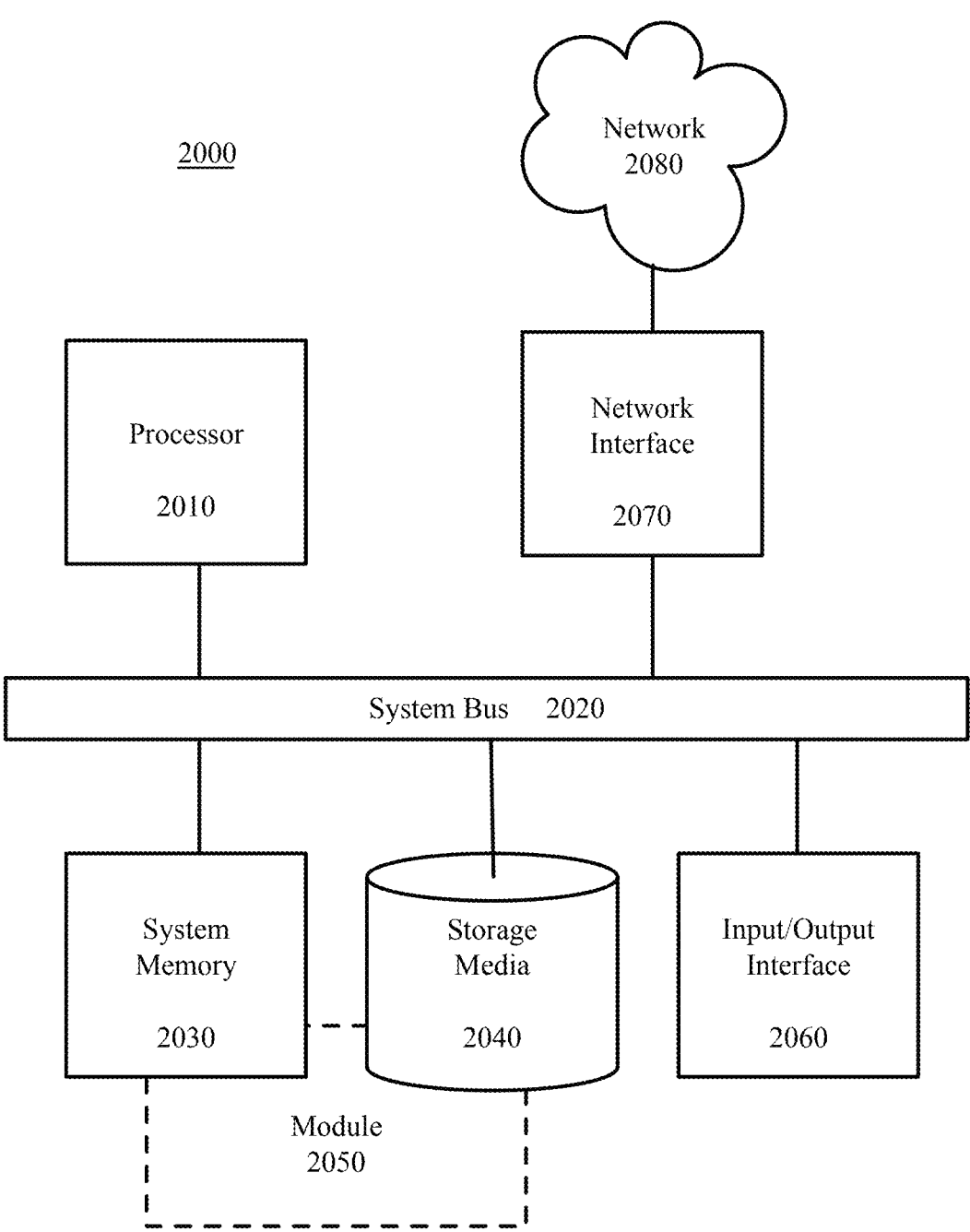
FIG. 18 depicts a computing machine and a module.

In example embodiments, the network computing devices and any other computing machines associated with the technology presented herein may be any type of computing machine such as, but not limited to, those discussed in more detail with respect to FIG. 18. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 18. The computing machines discussed herein may communicate with one another, as well as with other computing machines or communication systems over one or more networks, such as network 99. The network 99 may include any type of data or communications network, including any of the network technology discussed with respect to FIG. 18.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the present invention covers such modifications and variations that come within the scope of the invention.

The technology for embodiments of the invention may employ methods and systems to allow a network of machines, services, or other objects to correlate simulated and actual customer journeys to expected outcomes from changes in inputs and drivers. The examples for embodiments of the invention may employ computer hardware and software, including, without limitation, one or more processors coupled to memory and non-transitory computer-readable storage media with one or more executable computer application programs stored thereon, which instruct the processors to perform such methods.

The example methods illustrated in FIGS. 2-5 are described hereinafter with respect to the components of the example communications and processing architecture 100.

FIG. 2 is a block diagram depicting a method for a user to input analysis requests.

In block 210, a user accesses the correlation system 120 via website or application on user computing device 110. The user computing device 110 may be connected to the correlation system 120 over the network 99 or in any other suitable manner, such as by a wired connection. The user computing device 110 may open a website of the correlation system 120 or connect to the correlation system 120 via an Internet connection on an application operating on the user computing device 110. The user may navigate via links or interface options on a user interface of the correlation system 120 to a desired webpage or application page. In the example, the user navigates to a page that allows input of structured questions to the correlation system 120 for analysis of trends, journeys, drivers, and other variables related to customer actions.

In block 220, the correlation system 120 provides structured question input options with fillable data fields. A graphical user interface represented on the page on the correlation system 120 divides the question structure into components. For example, the structure may include a question into a type of impact of some action, a type of customer that will be simulated or whose actions will be predicted or analyzed, a time frame during which the action may be taken, and a metric customer that will be impacted. The structure of the question may vary based on the type of results sought or the type of data available.

The question may be inputted by the user by entering the elements of the question in one or more data fields. The data fields may be labeled to indicate the type of data that each data field is capable of processing. The data fields may receive inputs via a pull-down menu, by typed responses, by autofilled entry, by voice recognition, or by any suitable data entry mechanism. When combined in a narrative flow, the data field entries form a complete question for analysis. For example, the narrative question may be formed by data fields having an entry for the type of impact that changing a variable trigger or input would cause. The narrative question may be formed by data fields having entries to identify the type or class of customer for which the impact would cause a desired reaction. In an example, by changing the variable trigger to a different trigger, the narrative question would change to describe the type of impact the second trigger would have on the particular class of customer. Any of the data field variables may be changed to explore different results.

Figure 6:
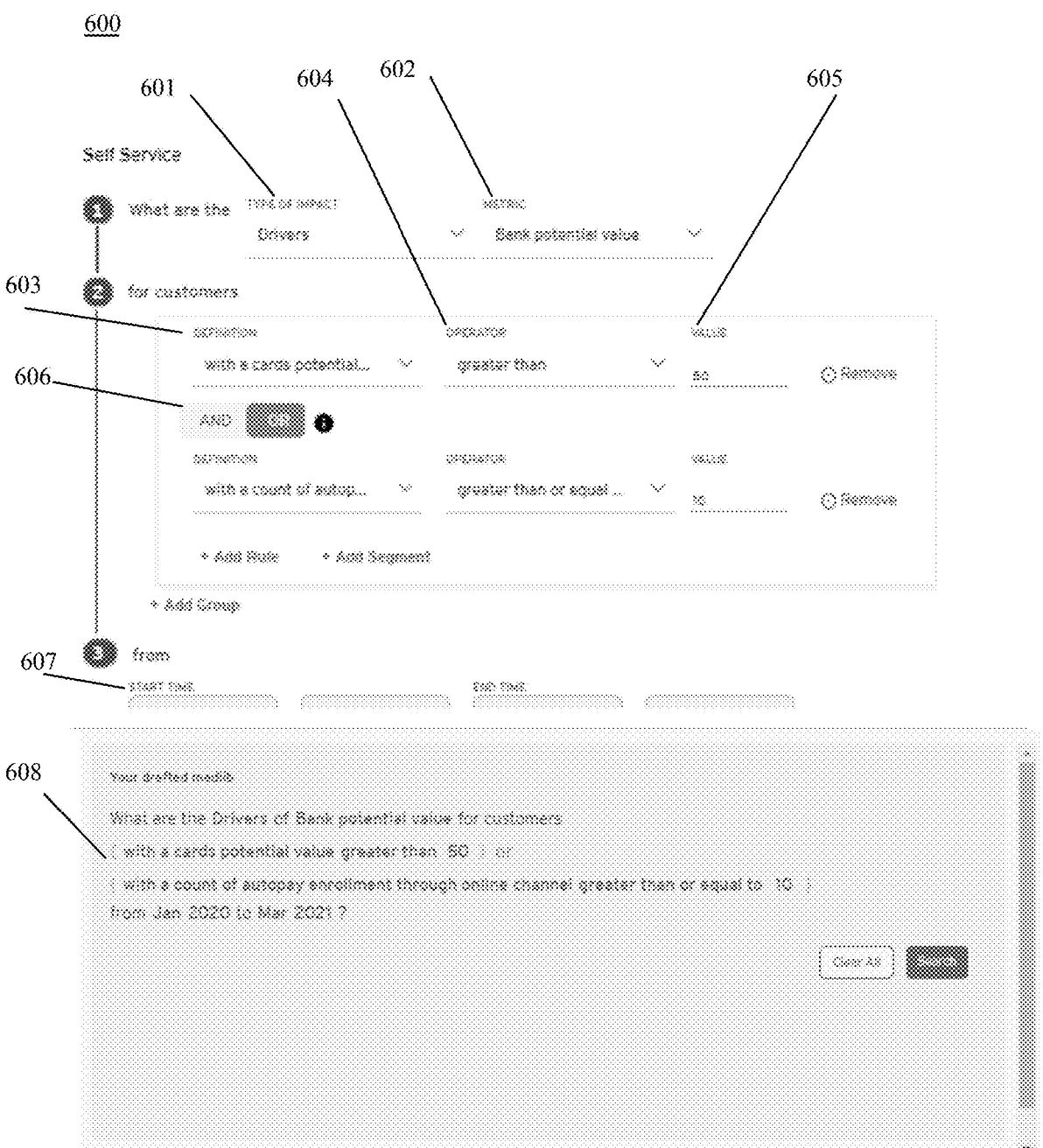
FIG. 6 is an illustration of a user interface for entering data into data fields to create a plain language query.

An example structured question input user interface with fillable data fields is described in greater detail in FIG. 6.

FIG. 6 is an illustration of a graphical user interface 600 for entering data into data fields to create a plain language query. In the example graphical user interface 600, sample data is entered into the data fields to form a narrative plain language question. A first data field 601 is labeled "type of impact." The impact entered by the user is "drivers." By entering drivers in the impact field, the narrative question would be asking the correlation system 120 to predict what drivers would cause a customer to take a particular action. Other types of impacts that might be entered in the impact data field 601 include, but are not limited to, detractors, associated features, anomalies, trends, or volumes.

Data field 602 is labeled "metric." The metric would be the institution measurement that is being impacted. The metric entered by the user is "bank potential volume." By entering the metric in the metric field, the narrative question would be indicating to the correlation system 120 the aspect of the institution 140 that customer actions will affect. Other types of metrics that might be entered in the data field 602 include, but are not limited to, call volume, cost per view, diversity measurements, complaint volume, paperless enrollment, adoption rates, retention, or spending.

Data fields 603, 604, and 605 identify the customers to be examined, analyzed, simulated, or predicted. The three data fields 603, 604, and 605 are used individually or collectively to identify customers or customer groups that meet a particular customer profile. In the example, data field 603 has an entry that identifies customers "with a cards potential value." Data field 604 has an entry that identifies that the cards potential value should be "greater than" an entered value. Data field 605 has an entry that identifies that the value as "50." When combined into a narrative, the data fields 603, 604, and 605 identify that the question asked will apply to customers with a cards potential that is greater than $50.

In other examples, the data field 603 might include customers with "a number of accounts," "a total amount of funds stored," "an account age," "a risk factor," "gold level accounts," "overdraft charges," or any other type of suitable factors.

The data field 604 might include operators such as "greater than," "less than," "longer than," "during," "after," "before," "using," or any other suitable operator.

The data field 605 might include operators such as a dollar value, a dimensionless number, "3 months," "receiving an incentive," "in New York," "highest," "registered cards," or any other suitable qualifier for the metric.

Combining these data fields would create a question phrase. For example, the phrase may include customers with "an account age of less than 3 months." Another example may include customers with "a risk factor greater than low." Another example may include customers with "an incentive received at least in than this quarter." Another example may include customers with "travel spending using only institution accounts." Any combination of data field variables may be combined to create applicable question phrases.

Data field 607 includes fields to enter the start and end times for any analysis period. A user may enter in a date for each of the fields 607 related to the time period, such as January 2021 to March 2021. In another example, the time periods entered into the data field 607 are from 2014 to 2018. Any manner of representing the times or dates may be utilized. For example, a pull down calendar may allow a user to scroll to and select a particular date. In another example, a user may type in a date, such as in a mm/dd/yyyy format.

Object 606 is a user interface object that allows a user to select options for combining search questions. For example, the interface object 606 has an "and" option and an "or" option. The user may enter a second question narrative that requires both or either of the two narratives to be searched. For example, a user may enter a first narrative that asks "what is the trend in dollars spent of customers that live in New York" and then select the object 606 for AND. The user then enters data for the second set of data fields to ask "what is the trend in dollars spent of customers that live in Atlanta." When combined the entries would result in a narrative question that asks "what is the trend in dollars spent of customers that live in New York AND customers that live in Atlanta?"

Combined with the other data fields on the user interface 600, a full narrative question may be created. In an example, the fields may combine to form a narrative question such as "What are the drivers of potential value for cardholders with debt greater than 1000 dollars from 2019 to 2020 OR for cardholders with minimum payments greater than 100 dollars from 2019 to 2020." Another example question is "what are the trends of call volume for customers that are enrolled in paperless communication in Q1 AND that have a risk level of high in Q1?"

The example illustrated in FIG. 6 includes a display box 608 that displays the question in narrative form. After pulling the data from the various data fields, the display asks "What are the Drivers of Bank potential value for customers with a cards potential value greater than 50 or with a count of autopay enrollment through online channel greater than or equal to 10 from January 2020 to March 2021?"

Returning to FIG. 2, in block 230, the user enters the data in the data fields as described herein for the type of impact that one or more actions will have on one or more type of customers. The user accesses the data fields as described in block 220 and enters the data in the data field to construct the narrative question.

In block 240, the correlation system 120 optionally provides a plain language search function to provide previous analysis results. The correlation system 120 provides a graphical user interface function to the user on the user computing device 110 to enter plain language questions. For example, a user can type a question in a search bar of the user interface. The correlation system 120 will autofill answers to the questions based on previously analyzed questions and/or provide a list of answers to the questions based on previously analyzed questions.

To autofill or suggest a previously analyzed question, the correlation system 120 stores one or more previously asked questions, such as the question created in block 220 of FIG. 1. When an analysis is performed as described herein, the correlation system 120 stores the question and the results of the analysis in a database or other storage location. When a user begins typing in the search bar of the user interface, the correlation system 120 autofills the entry with one or more questions from the database that are related to the words typed by the user.

For example, if the user types in "what is a distractor of," the correlation system 120 accesses questions from the data base that begin with "what is a distractor of . . . " Then the correlation system 120 ranks the most likely question based on one or more factors such as how many users have asked this question, how many users elect this autofill as their question, how relevant the question is to the particular user and previous user history, or any other suitable factors. In the example, the correlation system 120 autofills "what is a distractor of . . . " with " . . . complaint volume for customer who are new customers in 2021?" If this is the question that the user desires, then the user signifies this intention by clicking on the autofill, hitting enter, or performing any other suitable selection action. If the user selects a suggested question, then the previously performed analysis of the question is accessed from the database or other storage location. The analysis is presented to the user on the user interface as described herein.

In another example, the correlation system 120 provides a user interface with a list of relevant or similar questions asked. After the user enters the question, the correlation system 120 presents the related questions with links to allow the user to select one of the previously answered questions. In an example, the correlation system 120 provides questions with more details than the asked question. For example, if the user inputs "what is a distractor of complaint volume for customer who are new customers," the correlation system 120 may offer previous questions such as "what is a distractor of complaint volume for customers who are new customers in 2019," or "what is a distractor of complaint volume for customers who are new customers in Georgia."

FIG. 3 is a block flow diagram 300 depicting a method to create an analysis responsive to a user request.

In block 310, correlation system 120 selects a graphical response type based on the question asked. The correlation system 120 is configured to select an appropriate style of graphical response to the specific query being asked. For example, a question about a trend of user actions over time may select a line graph that tracks the user actions on a y-axis and an increasing time frame on the x-axis. The line graph has units on the two axes that correspond to the question asked. For example, the user actions may be accounts opened by the user. In this example, the number of accounts is represented on the y-axis and numbered 0, 1, 2, 3, and 4. The range of units on the y-axis is selected to provide a spread of data entered such that the resolution of the data is appropriate. In other examples, bar graphs, pie charts, data clusters, or any other type of graphical response may be utilized.

In block 320, correlation system 120 creates a data tree with decisions made at each branch based on the entered data fields by the user and compares the single branch at the terminal end of the data tree to related decision trees. For example, a question entered by the user may be "what is the trend in dollars spent of customers that live in New York in 2019 to 2021?" The correlation system 120 builds a data tree that starts with "customers." The data tree then splits to show a branch with customers that live in New York while the main branch includes all other customers. The branch splits again to show a branch of users that spent dollars while the other branch illustrates users that did not spend dollars. The branch may split again to show users that spent dollars in one or more of 2019, 2020, or 2021. The final branch of the data tree will have spending data of customers that live in New York for the years 2019-2021.

In another example, the user asks "what are the drivers that cause existing customers to open a second account in Q1." As in the previous example, the correlation system 120 creates a data tree that identifies a branch for each of the potential identified drivers, such as advertisements, incentives, email offers, rewards plans, or any other type of drivers. Branches are split from each of these branches based on customers that opened a second account, and customers that opened the account in the desired time frame. Eventually, the final single branches are compared to determine the differences in the outcomes. For example, a first data tree is a for customers that opened the account in the desired timeframe after receiving an advertisement on the website. This first data tree indicates that 100 customers opened an account after receiving the advertisement. A second data tree indicates that 500 customers opened an account after receiving a $50 bonus upon opening the account. By comparing the two data trees, the system may determine that offering the $50 bonus is a more effective driver than providing an advertisement on the website. The user asking the question may use this information to determine a future strategy for encouraging users to open a second account.

In block 330, the correlation system 120 determines that the difference in the results of the created data tree and the related decision tree is based at least in part on the difference in the data sets. The correlation system 120 is configured to tie any of the information to business metrics such as potential value of customer, digital engagement scores, or other metrics derived from analyzing the data trees of models focused at a customer level. The engines are driven by decision trees, in which smaller and smaller subsets of data (branches) are created. With highly granular datasets, such as the single branches described herein, the impact of each of the potential options, features, business plans, or other strategies have on a specific key performance indicator ("KPI") may be determined. By examining the outcome of a specific series of events (a single branch), and comparing the outcome to a closely related series of events (a different branch), where the change in outcome is attributed to the differences in the data sets (difference between branches), more effective strategies may be determined.

In block 340, correlation system 120 creates model scores of real and simulated customers. The correlation system 120 may create data trees and other models of customers. That is, for each customer in the correlation system 120 system, the correlation system 120 may determine the process or journey of the customer, the triggers provided by and to the customer, the actions taken by the customer, the history of the accounts of the customer, the timing of various actions of the customer, demographic data of the customer, and any other suitable characteristics, actions, or statuses of the customer. The correlation system 120 creates a model of the user based on the determined data.

The correlation system 120 may combine or otherwise synthesize the model of the customer with one or more other customer models to create models that simulate a typical customer. For example, if a group of customers have a median of 3 accounts and a mean of 3 accounts, then a simulated model of a customer similar to the group would have 3 accounts. Any type of advanced statistics, algorithms, machine learning, or predictive modeling processes may be used to create the simulated models. For example, classification models, clustering models, forecast models, outlier models, and time series models may be used. Any type of predictive algorithms may be used to classify the data, such as random forest, GLM for two values, gradient boosted model, K-Means, and prophet.

In block 350, correlation system 120 creates cohorts by clustering models of customers. The clusters may be based on the models' financial value potential or other characteristic of the models. The correlation system 120 ties together various models of customers and creates cohorts of customers by clustering the models. The outputs of the clustered models along with their characteristics, such as the financial value potential to the institution, enables the correlation system 120 to identify opportunities for marketing, customer experience remediation, and other areas for improved customer service. Alternatively, other types of cohorts or clustered models may be created. For example, clusters based on account age, location, number of accounts, types of accounts, customer response to incentives, customer complaint frequencies, or any other factor in the models may be used.

In an example, once such clusters are created the correlation system 120 will overlay financials into the clusters enabling users to determine a value of the cohort in the cluster. The correlation system 120 can drive auto-creation of segments for further analysis via the user question input functions or other functions. In an example, the clustering of the models is powered by a K Means algorithm. In this algorithm a certain number of data points (k data points) are seen as a "centroids," and all other data points are grouped in accordance to the nearest centroid. The grouping is performed with every combination of datapoints acting as centroids until the combinations of datapoints are at their densest. The combination with the datapoints that is most dense is the combination that is used as the final clusters.

In block 360, correlation system 120 uses clustered models to determine likely impact of varying input parameters. The correlation system 120 selects a cluster of models and simulates a change in input or analyzes the effects of previous changes in inputs. For example, the correlation system 120 changes a model input such as by simulating an increase in the cost for opening a new account. The correlation system 120 wants to predict the impact of the cost increase on users that have held accounts over 10 years. The correlation system 120 selects the cluster of models based on account ages. The correlation system 120 varies the inputs to the cluster of models by running simulations with varying costs for opening a new account. The correlation system 120 may simulate the inputs on each of the models in the cluster or on a simulated model that aggregates or models the cluster of models. Alternatively, the correlation system 120 examines previous increase in the cost for opening a new account for customers in one or more clusters.

Figure 7:
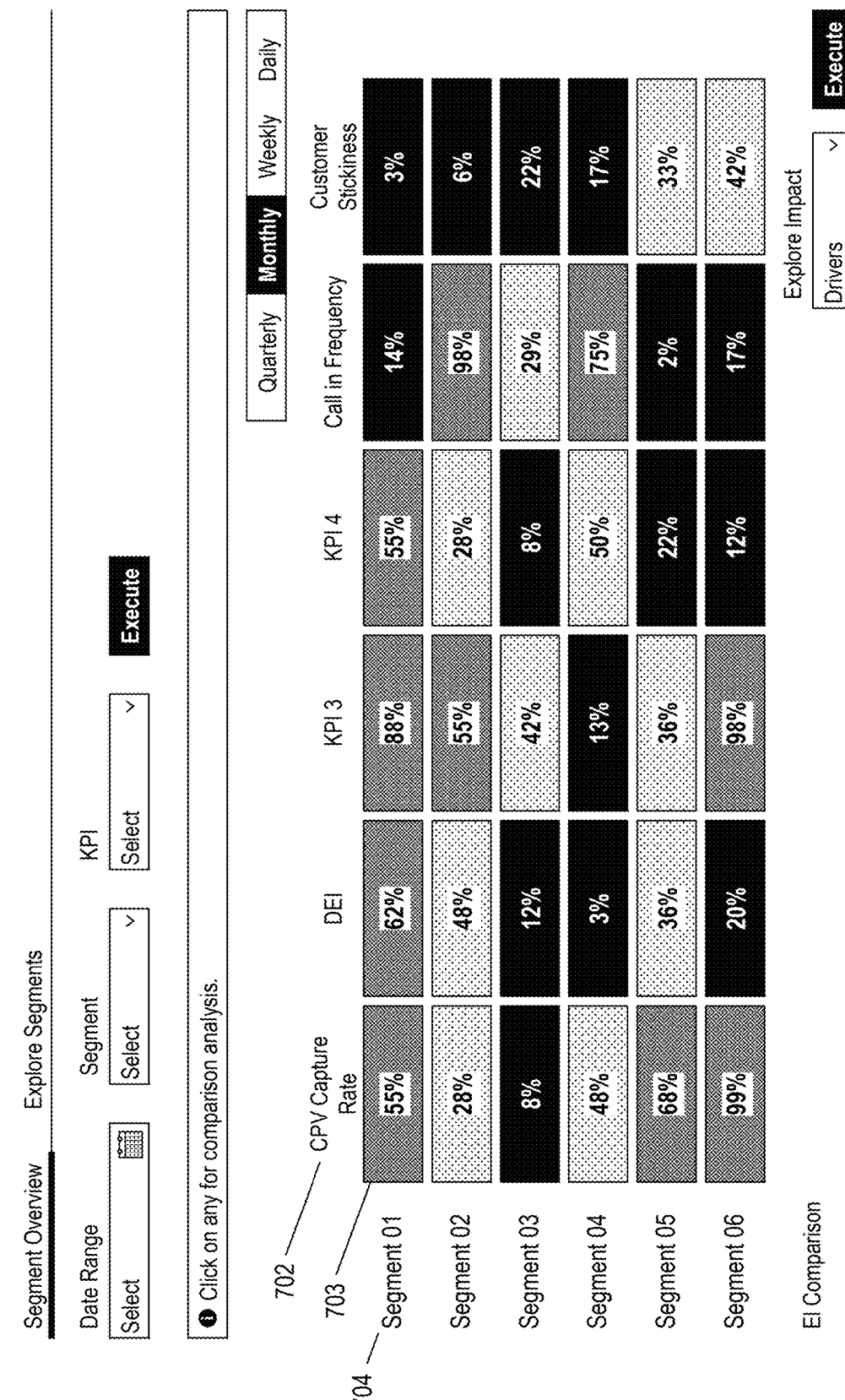
FIG. 7 is an illustration of a user interface displaying a comparison of various cohorts by selected Key Performance Indicators ("KPI").

The clustering of models is illustrated in FIG. 7. FIG. 7 is an illustration of a user interface 700 displaying a comparison of various cohorts by selected Key Performance Indicators ("KPI"). As illustrated, customers are divided into segments 701 such as Segments 01 through 06. Each segment 701 is divided by different KPIs such as CPV Capture Rate 702. Each of the buttons 703 in the user interface 700 may be clicked to view a comparison analysis for that segment and that KPI. For example, the top left button 703 would display the results of an analysis of how Segment 01 701 interacts with the CPV Capture Rate 702. For example, the analysis may illustrate the factors and drivers that cause the CPV Capture Rate 702 for customers in Segment 01 701 to increase or decrease.

Figure 8:
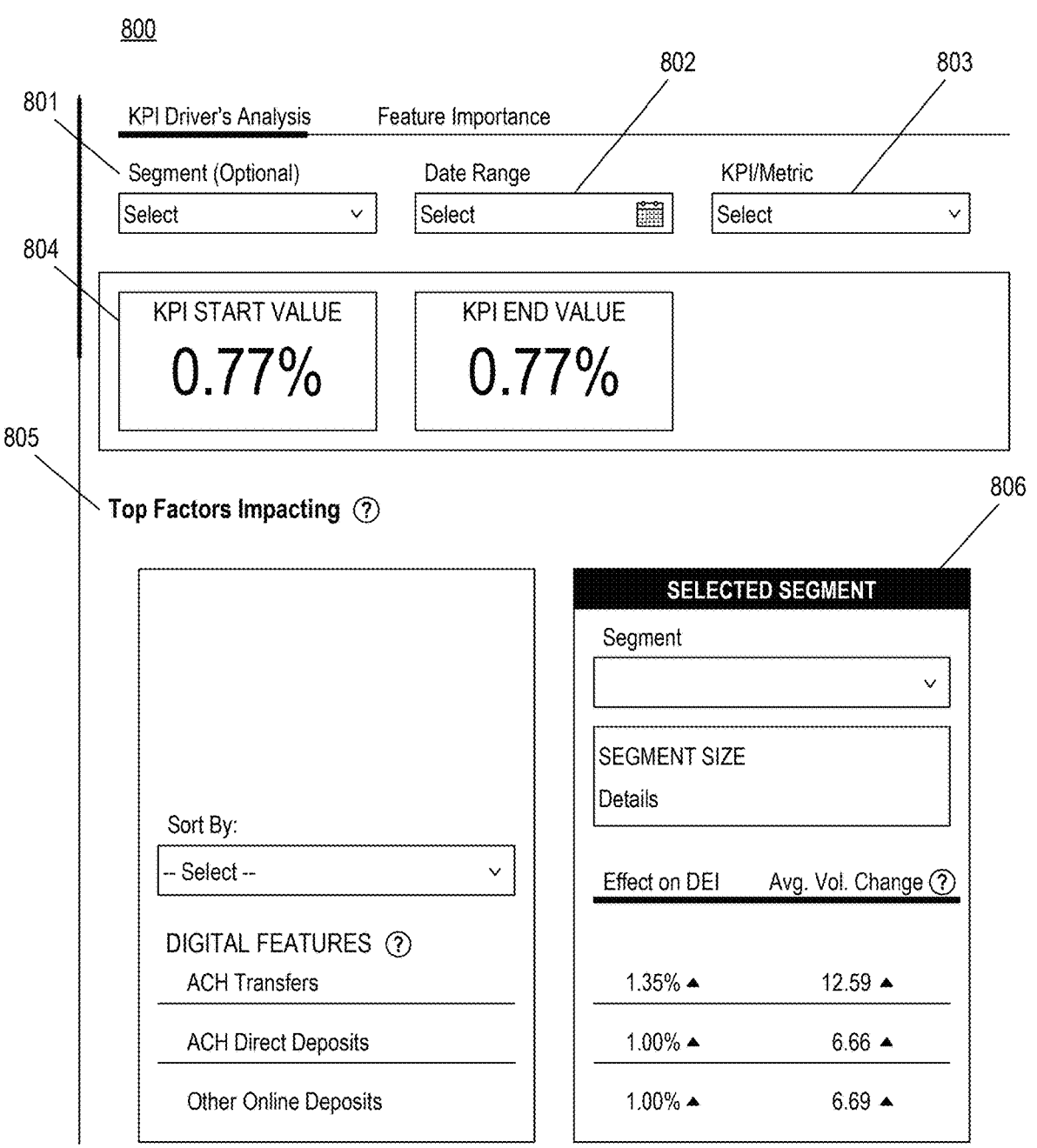
FIG. 8 is an illustration of a user interface displaying drivers for selected segments along with KPIs that are selected for driver analysis.

FIG. 8 is an illustration of a user interface 800 displaying drivers for selected segments along with KPIs that are selected for driver analysis. As illustrated, a user may select the Segment of customers to be analyzed in a segment input interface object 801. The user may enter selections for the date range 802 and the KPI or metric 803 to be analyzed for the selected Segment. The user interface 800 will display the KPI start value and end value 804. The user interface 800 may display the top factors 805 affecting the KPI or metric and an overview of the selected segment, such as the segment size, number of accounts, location, or any other suitable factors. The user interface 800 may display details about the selected segment in a selected segment object 806.

The segment object 806 may display details such as the segment size, the Effect on DEI and the average volume change.

Figure 9:
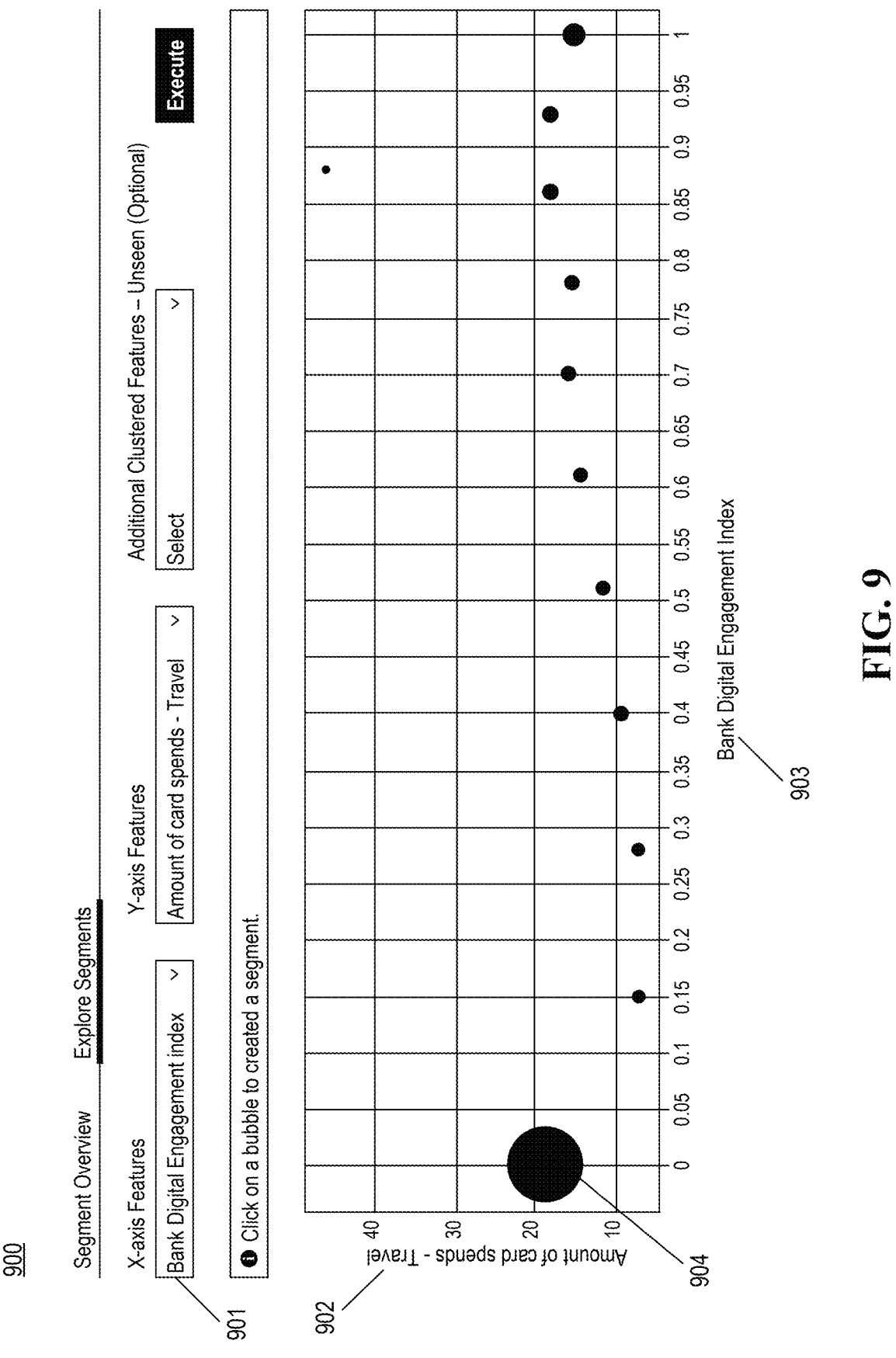
FIG. 9 is an illustration of a user interface displaying clusters of customers.

FIG. 9 is an illustration of a user interface 900 displaying clusters of customers. After clusters are created, the correlation system 120 will overlay financials into the clusters enabling end users to determine a value of the cohort in the cluster. The clusters are illustrated as being on a graph with amount of Bank Digital Engagement index 902 on the x-axis and amount of card spends 903 on the y-axis. Knowing the value of each cluster will allow the system to use the clusters in the analysis of drivers and other questions as described herein. The user may configure the x-axis and the y-axis via user interface objects 901. The user interface objects 901 may utilize pull down menus, data field entries, or any other suitable user interface technology. The cluster 904 is displayed on the graph in a location corresponding to the cluster's Bank Digital Engagement index amount of card spends. The size of the display of the cluster 904 may correspond to the size of the cluster 904, such as based on the number of customers in the cluster.

The correlation system 120 can use the clusters and their expected value as data points in the predictive models. The clustering is powered by a K Means algorithm. In this algorithm a certain number of data points (k data points) are seen as a "centroids," and all other data points are grouped in accordance to the nearest centroid. The grouping is done with every combination of datapoints acting as centroids until the combinations of datapoints are at the densest. The combination of that produces the densest data points are used as the final clusters.

Figure 10:
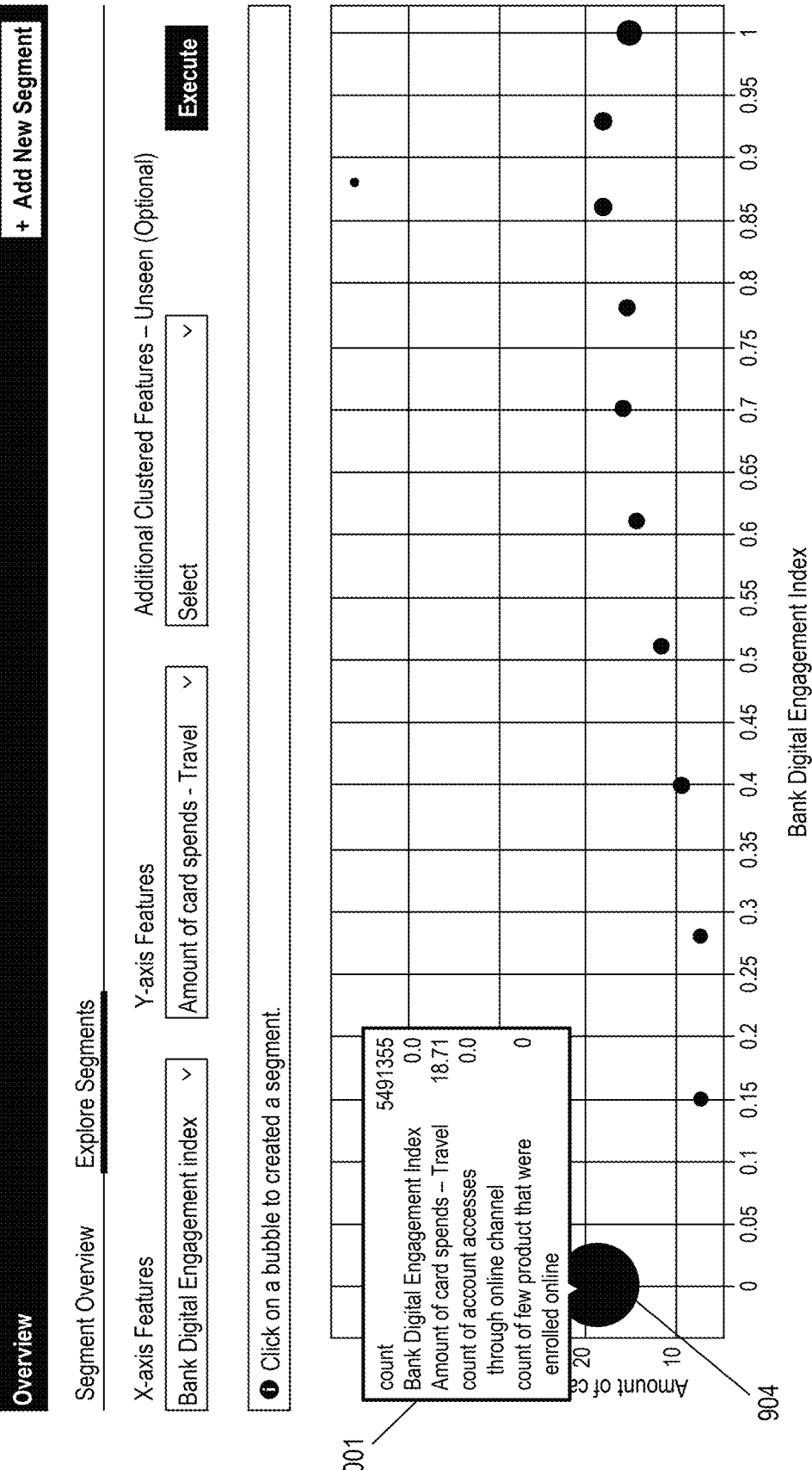
FIG. 10 is an illustration of a user interface displaying clusters of customers overlaid with financial data.

FIG. 10 is an illustration of a user interface 1000 displaying clusters 904 of customers overlaid with financial data. In an example, a curser of the user interface 1000 may be hovered over the cluster 904 and a popup window 1001 displays data about that selected cluster 904. Any other suitable display may be used instead of a popup window 1001. For example, a second window may open, a banner may open with the additional data, or any other suitable display of the additional data.

Returning to FIG. 3, in block 370, the correlation system 120 connects steps of customers or models to create customer sessions. The correlation system 120 is configured to log the actions of customers over time to create journeys of the user with the institution 140. For example, a customer may receive an advertisement, open an account, use the account, open a second account, log a complaint, receive an incentive, increase the funds in an account and then cease using one account. This series of events are a journey of the customer with the institution 140. The correlation system 120 connects journeys or steps taken by customers to a value of customer in each step of the journey to determine enhancements to journey based on business parameters such as volume, value, and expense. Single interactions through all channels are rolled up into "sessions," ordered in the sequence they occurred, and are tied to a physical chain of events. Metadata associated with these events can be utilized to filter specific segments highlighting core paths of interest. The correlation system 120 can determine which factors or inputs improved the subsequent steps and predict if additional input changes would have a similar effect.

Figure 11:
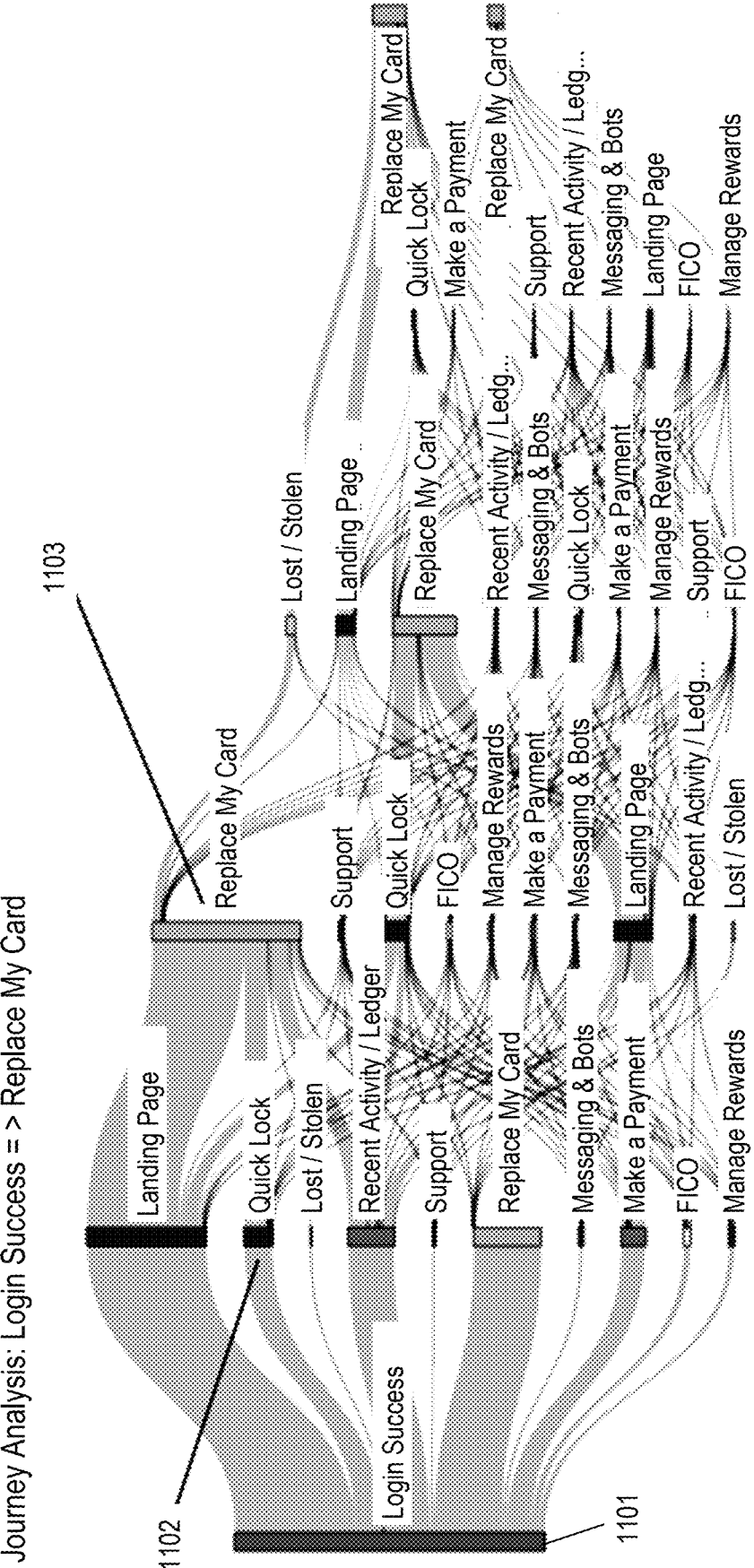
FIG. 11 is an illustration of a user interface displaying journeys of customers to specified results.

FIG. 11 is an illustration of a user interface 1100 displaying journeys of customers to specified results. The illustration depicts an experience analysis of customers that started at "login success" and ended at "replace my card." The experiences depict the relative numbers of customers that went to a landing page, a recent activity page, a make a payment page, and other pages. In the example, a percentage of customers that had a successful login proceed to a "quick lock" page 102. A number of customers that went to quick lock page 1102 then proceeded to a page to "replace my card" 1103. For example, this may be because the customer had reason to suspect fraudulent activity. The customer logged in and then navigated to a page to lock the card to prevent further fraudulent charges. The customer then needed a new card and proceeded to a page to get a new card issued. Other customers took different journeys in navigating around the website. Any journey or path of these customers may be logged and represented on this type of flow diagram.

Figure 12:
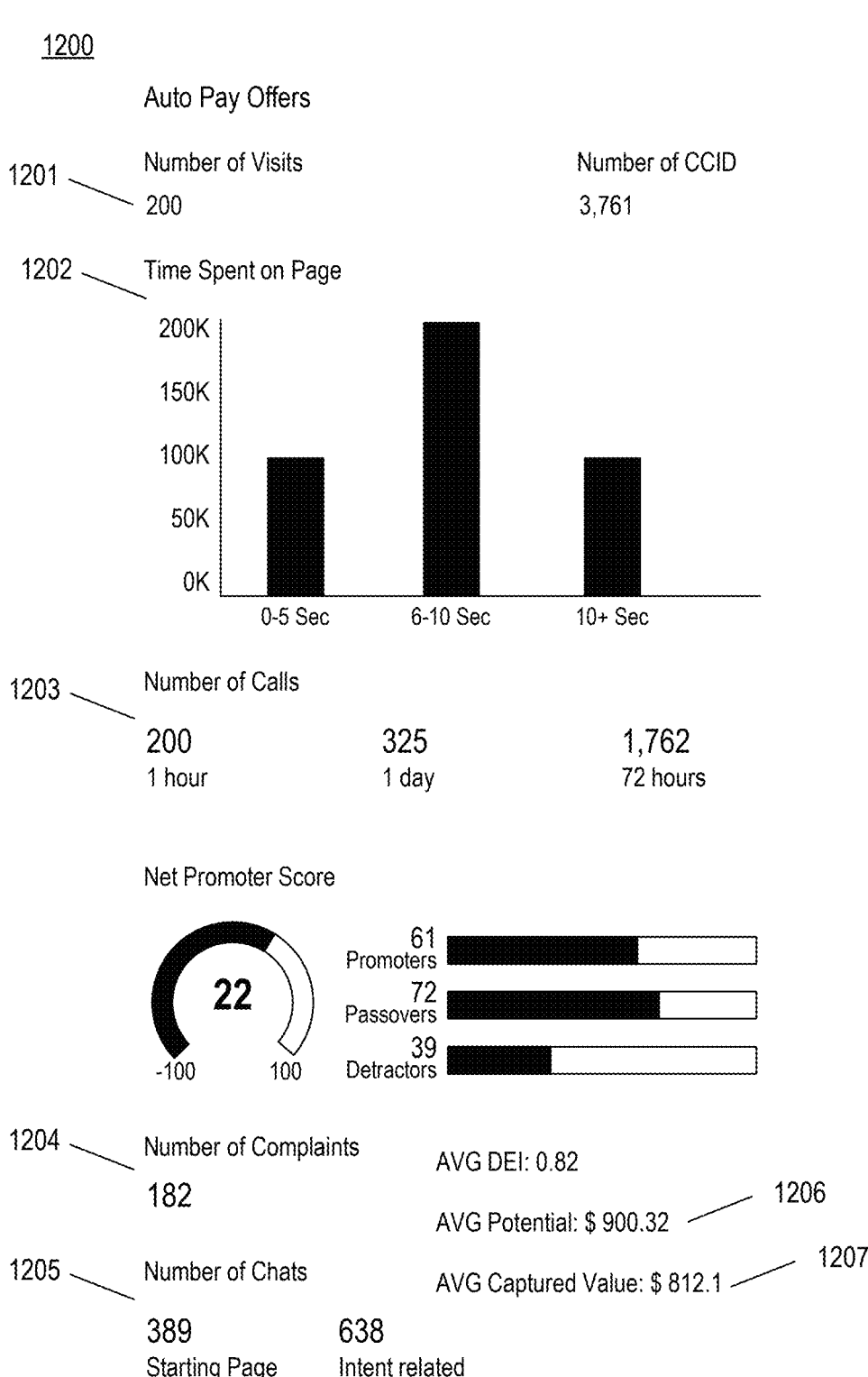
FIG. 12 is an illustration of a user interface displaying activities of customers on specific pages.

FIG. 12 is an illustration of a user interface 1200 displaying activities of customers on specific pages. In the example illustration, an "auto pay offers" page data is displayed. The illustration depicts a number of visits to the page 1201, time spent by visitors on the page 1202, a number of calls to the page 1203, a number of complaints 1204, a number of chats 1205, an average potential revenue 1206, and average captured value 1207, and other data from the visits. Each of these data points or any other suitable data points related to the "auto pay offers" page may be displayed in interface objects to allow a user to understand the traffic patterns, the usage rates, data about the customers using the page, or any other suitable data.

Returning to FIG. 3, in block 380, correlation system 120 provides the analysis to the user indicating the effect of one or more variables on the predicted outcome of the customer. After the question is created by the user, models of customers are created, the models are clustered, inputs are simulated, and results are determined. The correlation system 120 then maps the results into a user interface for presentation to the user. For example, if the correlation system 120 determines that the number of accounts per customer is correlated to the location of the customer, then the correlation system 120 may present a bar graph to the user that illustrates the number of accounts per customer for each of a configured number of locations.

FIG. 13 is an illustration of a user interface 1300 displaying completed queries. The illustration represents a graphical user interface 1300 that is displayed on a user computing device 110 by the correlation system 120. The graphical user interface 1300 may be displayed on a website, application, or other product of the correlation system 120. In the illustration, previously performed analyses of questions are displayed. The previously performed analyses are related to the questions asked, such as via the interface illustrated in FIG. 6. As displayed, the previously performed analyses had one or more of a similar impact 1302, KPI 1303, or potential drivers 1311 as the asked narrative question from the user. The display of the user interface 1300 includes the job name 1301, the segment 1304 of the institution involved, any benchmarks 1305 used, the time period 1306, the date created 1307, a confidence level 1312, a job ID 1308, a status 1309, and a button 1310 or other object to link to a page to view the results. Any of these features of the previously asked questions or other features of the questions may be interchangeably displayed on the user interface 1300 to assist a user in selecting a relevant previous question that may answer the user's question or otherwise assist the user in preparing future strategies.

Figure 14:
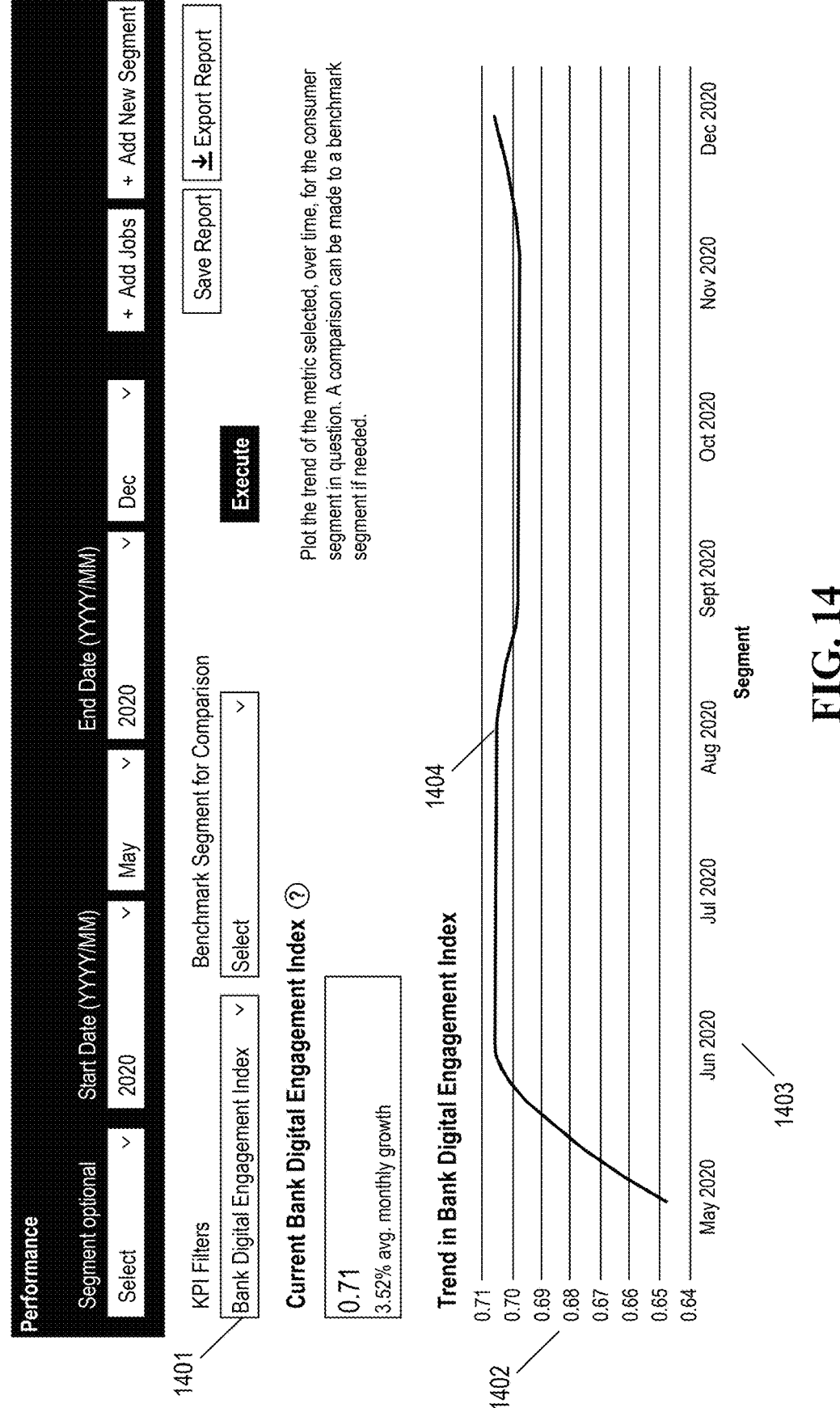
FIG. 14 is an illustration of a user interface displaying a graphical representation of customer trends.

FIG. 14 is an illustration of a user interface 1400 displaying a graphical representation of customer trends. The illustration represents a graphical user interface 1400 that is displayed on a user computing device 110 by the correlation system 120. The graphical user interface 1400 may be displayed on a website, application, or other product of the correlation system 120. In the illustration, a trend in bank digital engagement index is displayed. The x-axis indicates a time period 1402 from May 2020 to December 2020. The y-axis displays a current bank digital engagement index 1403 from 0.64 to 0.71. Thus, the line graph 1404 shows the change in the bank digital engagement index as it changes over time. The user may interpret the trend displayed in the graph to determine if any changes to the inputs, drivers, incentives, or other factors should be made to change the progression of the existing trend. The user may configure the x-axis and the y-axis via user interface objects 1401. The user interface objects 1401 may utilize pull down menus, data field entries, or any other suitable user interface technology.

Figure 15:
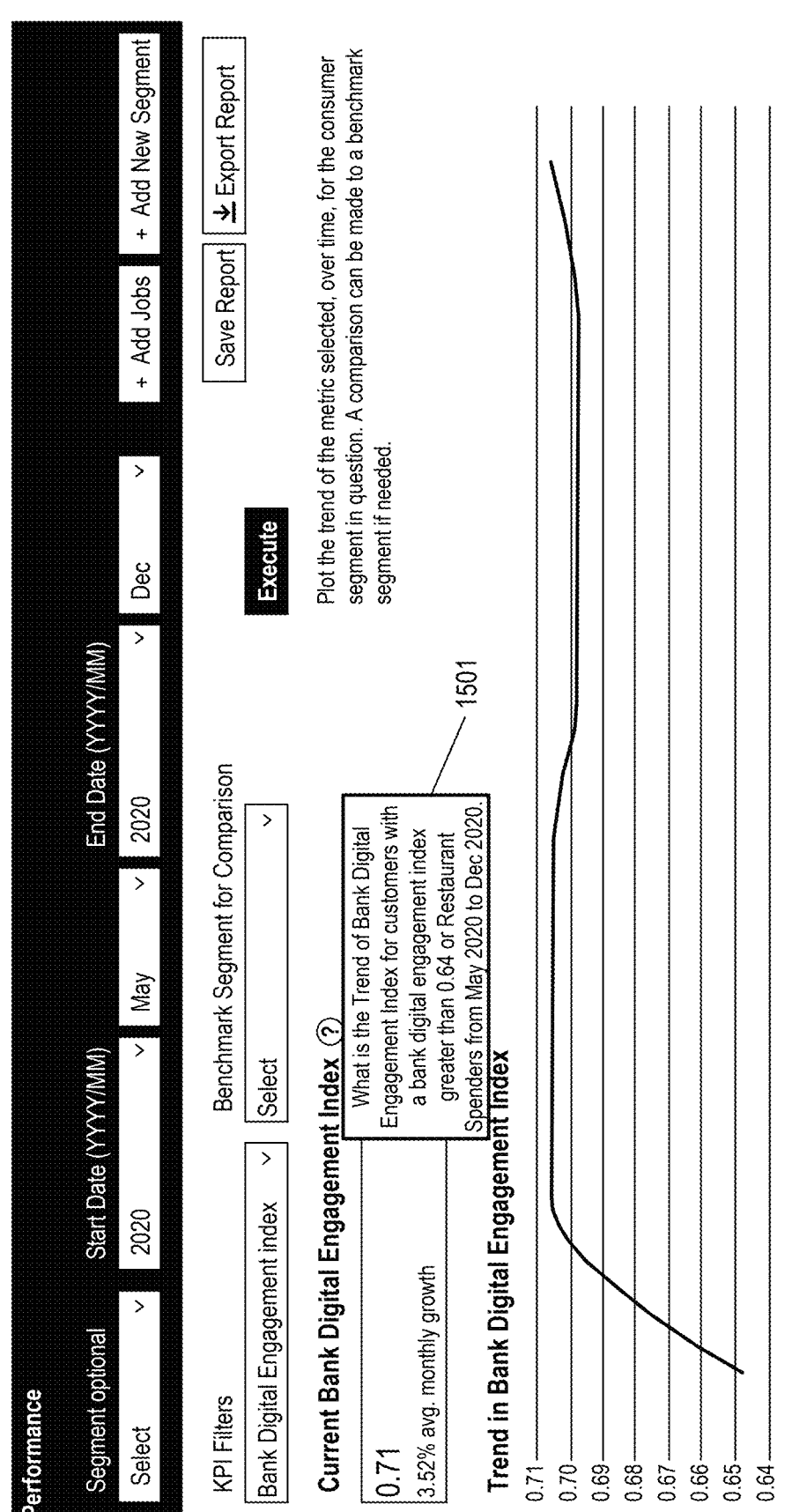
FIG. 15 is an illustration of a user interface displaying a graphical representation of customer trends.

FIG. 15 is an illustration of a user interface 15400 displaying a graphical representation of customer trends. In FIG. 15, a similar graph as illustrated in FIG. 14 is depicted with the addition of an interface object 1501 displaying the question asked by the user. The answer to the question asked is represented in the line graph as described in FIG. 14.

FIG. 16 is an illustration of an explanation screen 1600 for any analytics delivered in the user interface. The correlation system 120 provides an explanation display for any analytics delivered in the user interface to the user in response to a narrative question asked by the user. Since the system is expected to deliver analysis based on the illustrated or graphed patterns to users that are not necessarily skilled in interpreting analysis results, the correlation system 120 provides metadata to ensure that the user interpretation is accurate and adequate. The explanation display 1600 may provide a definition for each driver, KPI, account type, or any other element of the analysis. The explanation display may provide a narrative interpretation of data to ensure that the user understands the information from the user interface. Any other description of explanation of the data or the metadata, the process, the machine learning process used, or any other data may be displayed on the explanation display. The explanation display 1600 may include the feature analyzed 1601 such as a metric, the field 1602 of the analysis such as the Digital Engagement Index, the definition of the field 1603, the implications 1604 of the results, the date that the analysis was performed 1605, and any other suitable data for explaining the results.

FIG. 4 is a block flow diagram depicting a method to use the correlation system to execute strategies and update models.

In block 410, customers conduct account transactions with institution 140 using customer computing devices 130. The institution 140 is a financial institution or other type of institution that conducts transaction with customers. In other examples, the transactions are not financial transactions, but are instead transactions such as access transactions, data transfer transactions, authorization transactions, or verification transactions. The correlation system 120 may be a function or division of the institution 140. In another example, the correlation system 120 operates on a processor, server, or other device of the institution 140. The institution 140 may be a bank, a credit card processor, a government entity, a small business, a hospital, a university, or any other suitable type of institution 140.

The transactions conducted include transactions such as opening a new account, depositing funds in an account, withdrawing funds, configuring a password, entering contact information, conducting transactions using instruments of the institution 140, requesting assistance from the institution 140, accessing a location using instruments of the institution

140, requesting data from the institution 140, or performing any other type of transaction or action.

In block 420, a system of records 125 of the correlation system 120 stores account transactions in real time as received. As any type of transaction is performed by the customer, the system of records 125 stores the action, any related metadata, and any other related data to the transaction, such as the time, the location, the account used, or the amount. The transaction data is stored on a database or other storage apparatus or program. The transaction data is stored on a local server, in a cloud computing environment, or any other suitable storage mechanism. Newly received data is stored in the customer account in real time as the data is received. The customer storage file is updated with the real time data.

In block 430, the data lake 121 stores data records of customer received from channels 123, system of records 125, and third parties, including data related to marketing, servicing, journey, product, and demographics. The data lake 121 obtains data that is desired for processing or analysis. The data may come from any suitable location such as the channels 123 or the system of records 125. The data is associated with a particular customer using account numbers, metadata, or any other data element.

In block 440, the correlation system 120 simulates and tests selected variables based on data record and user requests. Block 440 is described in greater detail with respect to FIG. 5.

FIG. 5 is a block flow diagram depicting a method to simulate, execute, and test selected variables based on data record and user requests.

In block 510, the data lake 121 of the correlation system 120 receives data from channels, processors, and system of records. The data lake 121 receives customer level data and creates customer level data records. The data is received from channels 123, system of records 125 and other sources. The channels 123 interact with users to implement personalized actions for customers. The channels 123 use information from at least the customer analytic record 125 and output of systems such as the model engine 122.

In block 520, the data lake 121 creates customer level data records. The data lake 121 analyzes the customer data and sorts different data types into records to characterize and categorize user data. For example, a user's location and spending habits may be given a rating, a designation, or other rating or identifying data element and stored in the data lake 121 or other location. The customer level data record may cover items such as marketing, servicing, journey, product, and demographics data points.

In block 530, the correlation system 120 answers user-created questions and provides simulation results and analysis. The questions may be asked, created, answered, analyzed, or otherwise processed as described at least in FIGS. 2 and 3.

In block 540, users select target customer segments on which to deploy the developed strategy. After asking a question and receiving an analysis, a graphical representation of the results, or other answer to the question, the user selects a customer, a group of customers, a cluster, a cohort, or any other set of customers on which to apply a strategy based on the results. In an example, a user asked a question such as "what are the drivers for increasing card usage for new customers?" The result indicated that users with less than 1 year of history with the institution 140 are driven by rewards points more than any other driver. The user may take this result and decide that all users with less than 1 year of history with the institution 140 are to receive double rewards points for the next 6 months. Any other strategy may be utilized based on the results. The analysis provides the simulated results of different actions on different customers, but the user may select the customers to include in the group and the action to be executed based on any other suitable factors.

In block 550, the correlation system 120 communicates customer data and strategy to channels 123 and decision engine 126 to execute the developed strategy. The selected customers and the selected strategy are transmitted to the decision engine 126 to determine the actions to be taken. The decision engine 126 determines a series of steps to achieve the action requested. For example, if the user asks the correlation system 120 to provide a 30% discount on the next action that a customer takes, the decision engine 126 will create a set of rules to implement the action. For example, the decision engine 126 identifies the set of actions that qualify for the discount and a manner of applying the discount, such as with a rebate, a reduction at the time of transactions, or any other method of applying the discount.

The channel 123 will access customer level data records for each customer that is in the set of customers requested by the user. For example, if the user requests all users in the state of Florida receive bonus rewards points, the channels 123 will request the customer level data records from the customer records 124 and extract the users that have "Florida" in the location data of the customer level data records.

In block 560, channels 123 use the real time data along with customer data from the customer records 124 to execute the developed strategy. The channels, after identifying the appropriate customer set and the strategy to execute, apply the strategy to the customers. In the continuing example, after determining which customers are in Florida, the channels apply the bonus rewards points to those customers.

In block 570, real time data from the channels 123 are combined with the customer data from the customer records 124 and provided to the model engine 122 as input for additional machine learning. After applying the strategy to the set of customers, the data from the customers is updated in real time. For example, after providing an offer of a discount for opening a new account to a set of customers, the channels 123 will report the results to the customer records 124 for updating the customer level data records. If the customer opened a new account after receiving the offer, then that action will be added to the customer level data records. If the customer took a different action or no action at all, then that information will be added to the customer level data records.

The newly added data is communicated to the model engine 122 as new data for training the machine learning or other process for creating predictive models. The new data may serve to confirm the models' predictions or modify the models. For example, if a customer deposited fewer funds than predicted, future models will be created that take the new data as an input.

Figure 17:
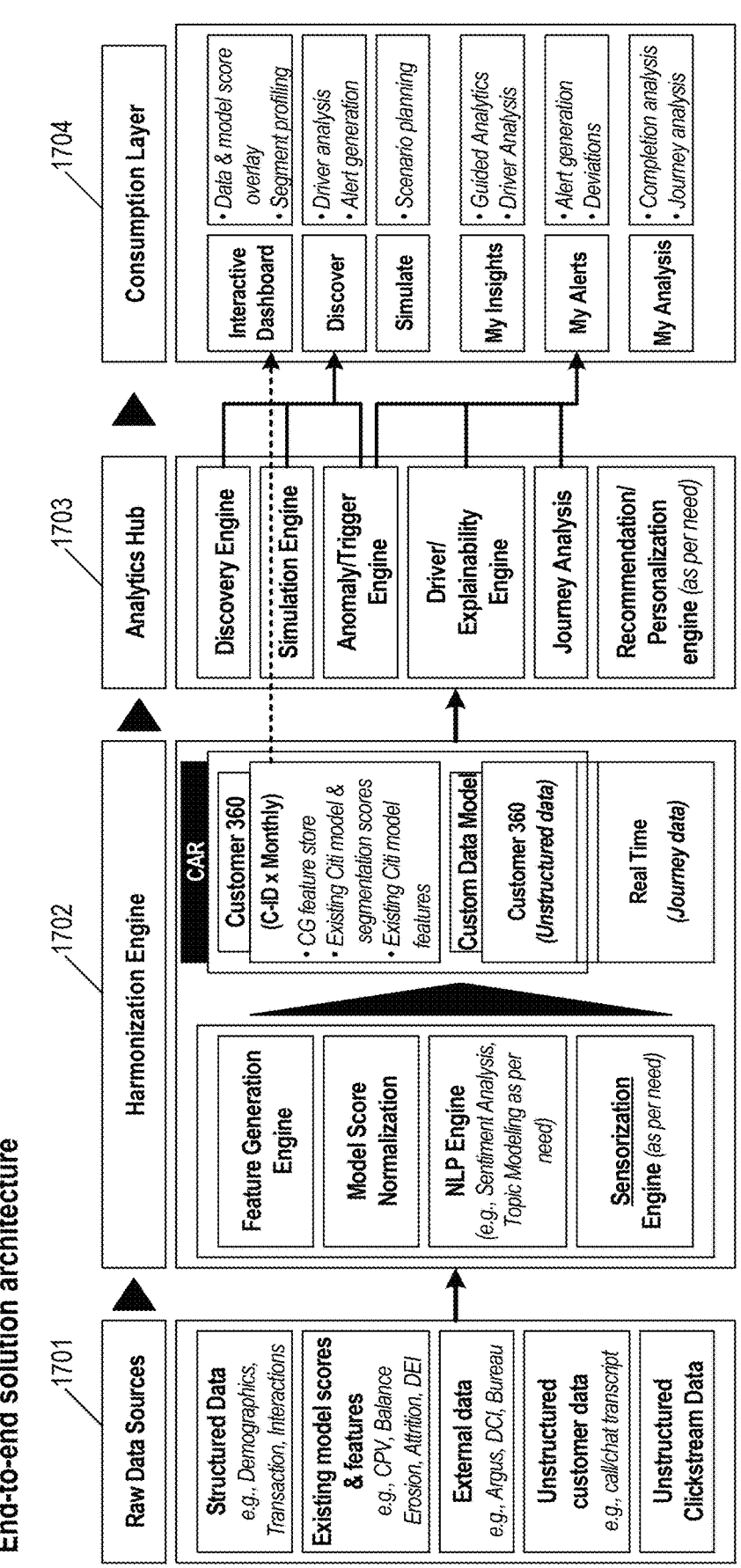
FIG. 17 is an illustration of an end-to-end system architecture.

FIG. 17 is an illustration 1700 of an end-to-end system architecture. The illustration 1700 depicts examples for sources of data 1701, the engines 1702 used for analysis, the analytics hub 1703, and a consumption layer 1704. For example, a raw data source 1701 may be "unstructured customer data." The engine 1702 may be a "feature generation engine." The analytics hub 1703 may be a "simulation engine." The consumption layer 1704 may be an "interactive dashboard."

Any suitable model is explorable in the correlation system 120 to allow users and business units to obtain the benefits described herein. The list of potential or considered models includes North American Personal Loan models for randomly targeting customers based on preselected criteria to understand targeting efficiency and enhance personal loan campaigns.

Another model considered is a Leads for Quality Client Growth model that leads to RM for Slide back pre-emption and facilitating Upgrades. Another model considered is Another model considered is Existing customer Negative Revenue Avoidance model that consists of two models that model for two separate customer behaviors driving negative incremental revenue. The first model is a Turn Transactor model that predicts the likelihood of an account to convert to transactor behavior from revolver behavior as a result of acceptance of offers. The second model is a Post-Pre Revolving Balance model that predicts the difference between average revolving balance post-conversion and average revolving balance pre-conversion for an account as a result of acceptance of offers. This model will identify accounts that reduce revolving balance significantly after conversion to DC.

Another model considered is existing customer Account level ICLI model—Gen II that serves as a click model used to predict the likelihood of an existing customer clicking on an offer in Account Online every time the customer logs in.

Another model considered is Digital Segmentation model that is able to classify the customer database into segments created based on a (separate) research study.

Another model considered is Direct Mail Response model that is to reduce operating expense by reducing direct mail where response rate is low compared to other initiatives.

Another model considered is Sales Growth Generic Response model that is to estimate account-level probability of customer's response to different sales growth offer.

Another model considered is HELOC cross sell to Retail Targeting model is a cross sell to retail model which will be used for retail population to open a home equity line of credit account. This model is a rank ordering model.

Another model considered is a Sales Growth Response model that estimates account-level probability of a customer's response to different sales growth offers.

Another model considered is a Sales Growth Incremental Spend model that can rank order customers according to the customers' incremental sales, considering how the customers would respond to a Sales Growth offer. In offer optimization, the rank order assists with predicting incremental net sales using the decile factor, calculated at a product segment decile level.

Another model considered is a Digital Engagement Index that provides a ratio of digital events to all events a customer engages with weighted based around complexity of an event.

Another model considered is a Customer Potential Value model that provides a calculation of a customers potential and captured value.

Another model considered is a Balance Erosion model that estimates the dollar amount an account is likely to decrease, relative to retail accounts.

Another model considered is a Balance Transfer Amount model that estimates the dollar amount an account is likely to transfer in after accepting a balance consolidation offer, as a continuous score.

Another model considered is a card type upgrades model that estimates account-level probability of a response to an upgrade offer.

Another model considered is a Mortgage Cross-Sell to Cards Non Homeowner model that is a suite of two cross-sell models. The first model is a Mortgage Cross-Sell to Cards for a Homeowner model and the second models is a Mortgage Cross-Sell to Card for a Non-homeowner model.

Another model considered is a Balcon Response model that predicts account level response rates to different offers (APR/Fee/Dur/Contact). The output of this model will enter a synthesizing and optimizing suite of models to assign account-level balance consolidation offers to solve constrained optimization of business objectives.

Another model considered is a Flex Loan Loan Amount model that predicts the loan amount a card holder will take given a loan offer with a fixed APR.

Another model considered is a Mortgage Cross-Sell to Retail Bank model that calculates the propensity of a N.A. Retail Bank Customer to apply for a Mortgage product.

Another model considered is a Flex Loan Response model that predicts a customer's probability of responding to a Flex Loan offer given APR and number of direct mails sent. The model is developed based on an XD population of E9'19. The prediction score is continuous and will be used together with a loan amount score and other input to optimize flex loan offers.

Another model considered is a NA Mortgage Refinance model that predicts the propensity to respond to a mortgage Refinance offer.

Another model considered is a Mortgage to Cards Homeowner may be used as a rank ordering tool for Mortgage to Cards Campaign. The Mortgage to Cards campaign will be used to target Cards customer.

Another model considered is a Authorized User Response model that may be used to rank order the eligible population for Authorized User into deciles.

Another model considered is a MRC ECM Segmentation that provides non-statistical, simple segmentation based on business judgements for existing multi-relationship customers.

Example Systems

FIG. 18 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands.

The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, Fire-Wire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system for utilizing a plurality of machine learning models to generate a response, comprising:
   a storage device; and
   one or more processors in a network system communicatively coupled to the storage device, wherein the one or more processors execute instructions that are stored in the storage device to cause the system to:
      receive an operator input for one or more actions that cause a user interaction to be performed;
      select, based on the operator input, a plurality of user-specific machine learning models, wherein each of the plurality of user-specific machine learning models is trained based on user interactions received as real time data from a corresponding user of a plurality of users and corresponding actions associated with the user interactions;
      select, based on the operator input, a model subset of the plurality of user-specific machine learning models, wherein the model subset corresponds to a user subset of the plurality of users;
      select a candidate operator action for the user subset;
      input, into each user-specific machine learning model of the model subset of the plurality of user-specific machine learning models, the candidate operator action to cause each user-specific machine learning model of the model subset to predict a corresponding user interaction, wherein inputting the candidate operator action causes each user-specific machine learning model of the model subset to simulate execution of the candidate operator action within each user-specific machine learning model in real-time without actual execution;
      determine whether the candidate operator action causes at least a threshold number of models of the model subset to predict the user interaction;
      based on determining that the candidate operator action causes at least the threshold number of models of the model subset to predict the user interaction, generate, based on the candidate operator action, one or more instructions for executing the candidate operator action in relation to the user subset; and
      execute the candidate operator action in relation to each user of the user subset.

2. The system of claim 1, wherein the instructions for selecting, based on the operator input, the model subset of the plurality of user-specific machine learning models further cause the one or more processors to:
   identify, within the operator input, one or more parameters representing one or more user characteristics of the plurality of users;
   match the one or more parameters with user parameters associated with the plurality of users; and
   select the user subset based on the user parameters that match the one or more parameters.

3. The system of claim 1, wherein the instructions for selecting the candidate operator action for the user subset further cause the one or more processors to:
   retrieve, from a training dataset used to train one or more machine learning models of the plurality of user-specific machine learning models, a plurality of operator actions leading to a plurality of user actions; and
   select the candidate operator action from the plurality of operator actions.

4. The system of claim 1, wherein the instructions further cause the one or more processors to receive, from each user-specific machine learning model of the model subset, the corresponding user interaction determined by each user-specific machine learning model.

5. The system of claim 4, wherein the instructions for determining whether the candidate operator action causes at least the threshold number of models of the model subset to predict the user interaction further cause the one or more processors to:
   determine, from each corresponding user interaction predicted by each user-specific machine learning model, a number of user interactions that match the user interaction received with the operator input; and
   determine whether the candidate operator action causes the model subset of the plurality of user-specific machine learning models to predict the user interaction based on the number of user interactions that match.

6. The system of claim 1, wherein the instructions for selecting, based on the operator input, the plurality of user-specific machine learning models further cause the one or more processors to identify user-specific machine learning models where a target feature corresponds to the user interaction within the operator input.

7. The system of claim 1, wherein the instructions further cause the one or more processors to:
   based on determining that the candidate operator action does not cause at least the threshold number of models of the model subset to predict the user interaction:
      select a second candidate operator action from a plurality of operator actions;
      input, into each user-specific machine learning model of the model subset of the plurality of user-specific machine learning models, the second candidate operator action to cause each user-specific machine learning model of the model subset to predict the corresponding user interaction;
      determine that the second candidate operator action causes at least the threshold number of models of the model subset to predict the user interaction; and
      generate, based on the second candidate operator action, one or more commands for executing the candidate operator action in relation to the user subset.

8. A method for utilizing a plurality of machine learning models to generate a response, the method comprising:
   receiving an operator input for one or more actions that cause a user interaction to be performed;
   selecting, based on the operator input, a plurality of user-specific machine learning models, wherein each of the plurality of user-specific machine learning models is trained based on user interactions associated with a corresponding user of a plurality of users;
   selecting, based on the operator input, a model subset of the plurality of user-specific machine learning models;
   selecting a candidate operator action for a user subset of the plurality of users corresponding to the model subset;
   inputting, into each user-specific machine learning model of the model subset of the plurality of user-specific machine learning models, the candidate operator action to cause each user-specific machine learning model of the model subset to predict a corresponding user interaction, wherein inputting the candidate operator action causes each user-specific machine learning model of the model subset to simulate execution of the candidate operator action within each user-specific machine learning model in real-time without actual execution;

determining whether the candidate operator action causes at least a threshold number of models of the model subset to predict the user interaction; and based on determining that the candidate operator action causes at least the threshold number of models of the model subset to predict the user interaction, executing the candidate operator action in relation to the user subset.

9. The method of claim 8, wherein selecting, based on the operator input, the model subset of the plurality of user-specific machine learning models further comprises:

identifying, within the operator input, one or more parameters representing one or more user characteristics of the plurality of users;

matching the one or more parameters with user parameters associated with the plurality of users; and selecting the user subset based on the user parameters that match the one or more parameters.

10. The method of claim 8, wherein selecting the candidate operator action for the user subset further comprises:

retrieving, from a training dataset used to train one or more machine learning models of the plurality of user-specific machine learning models, a plurality of operator actions leading to a plurality of user actions; and selecting the candidate operator action from the plurality of operator actions.

11. The method of claim 8, further comprising receiving, from each user-specific machine learning model of the model subset, the corresponding user interaction determined by each user-specific machine learning model.

12. The method of claim 11, wherein determining whether the candidate operator action causes at least the threshold number of models of the model subset to predict the user interaction further comprises:

determining, from each corresponding user interaction predicted by each user-specific machine learning model, a number of user interactions that match the user interaction received with the operator input; and determining whether the candidate operator action causes the model subset of the plurality of user-specific machine learning models to output the user interaction based on the number of user interactions that match.

13. The method of claim 8, wherein selecting, based on the operator input, the plurality of user-specific machine learning models further comprises identifying user-specific machine learning models where a target feature corresponds to the user interaction within the operator input.

14. The method of claim 8, further comprising:

based on determining that the candidate operator action does not cause at least the threshold number of models of the model subset to predict the user interaction:

selecting a second candidate operator action from a plurality of operator actions;

inputting, into each user-specific machine learning model of the model subset of the plurality of user-specific machine learning models, the second candidate operator action to cause each user-specific machine learning model of the model subset to predict the corresponding user interaction;

determining that the second candidate operator action causes at least the threshold number of models of the model subset to predict the user interaction; and generating, based on the second candidate operator action, one or more instructions for executing the candidate operator action in relation to the user subset.

15. One or more non-transitory computer-readable media storing instructions thereon, wherein the instructions cause one or more processors to perform operations comprising:

receiving an operator input for one or more actions that cause a user interaction to be performed;

selecting, based on the operator input, a plurality of user-specific machine learning models, wherein each of the plurality of user-specific machine learning models is trained based on user interactions associated with a corresponding user of a plurality of users;

selecting, based on the operator input, a model subset of the plurality of user-specific machine learning models;

selecting a candidate operator action for a user subset of the plurality of users corresponding to the model subset;

inputting, into each user-specific machine learning model of the model subset of the plurality of user-specific machine learning models, the candidate operator action to cause each user-specific machine learning model of the model subset to predict a corresponding user interaction, wherein inputting the candidate operator action causes each user-specific machine learning model of the model subset to simulate execution of the candidate operator action within each user-specific machine learning model in real-time without actual execution;

determining whether the candidate operator action causes at least a threshold number of models of the model subset to predict the user interaction; and based on determining that the candidate operator action causes at least the threshold number of models of the model subset to predict the user interaction, executing the candidate operator action in relation to the user subset.

16. The one or more non-transitory computer-readable media of claim 15, wherein the instructions for selecting, based on the operator input, the model subset of the plurality of user-specific machine learning models further cause the one or more processors to perform operations comprising:

identifying, within the operator input, one or more parameters representing one or more user characteristics of the plurality of users;

matching the one or more parameters with user parameters associated with the plurality of users; and selecting the user subset based on the user parameters that match the one or more parameters.

17. The one or more non-transitory computer-readable media of claim 15, wherein the instructions for selecting the candidate operator action for the user subset further cause the one or more processors to perform operations comprising:

retrieving, from a training dataset used to train one or more machine learning models of the plurality of user-specific machine learning models, a plurality of operator actions leading to a plurality of user actions; and selecting the candidate operator action from the plurality of operator actions.

18. The one or more non-transitory computer-readable media of claim 15, wherein the instructions further cause the one or more processors to receive, from each user-specific machine learning model of the model subset, the corresponding user interaction determined by each user-specific machine learning model.

19. The one or more non-transitory computer-readable media of claim 18, wherein the instructions for determining whether the candidate operator action causes at least the threshold number of models of the model subset to predict the user interaction further cause the one or more processors to perform operations comprising:

determining, from each corresponding user interaction predicted by each user-specific machine learning model, a number of user interactions that match the user interaction received with the operator input; and determining whether the candidate operator action causes the model subset of the plurality of user-specific machine learning models to output the user interaction based on the number of user interactions that match.

20. The one or more non-transitory computer-readable media of claim 15, wherein the instructions for selecting, based on the operator input, the plurality of user-specific machine learning models further cause the one or more processors to identify user-specific machine learning models where a target feature corresponds to the user interaction within the operator input.

\*   \*   \*   \*   \*